(12) United States Patent
Thomas et al.

(10) Patent No.: US 9,571,140 B2
(45) Date of Patent: Feb. 14, 2017

(54) SPACE-TIME CODING FOR ZERO-TAIL SPREAD OFDM SYSTEM IN A WIRELESS NETWORK

(71) Applicant: NOKIA SOLUTIONS AND NETWORKS OY, Espoo (FI)

(72) Inventors: Timothy Thomas, Palatine, IL (US); Frederick Vook, Schaumburg, IL (US); Amitabha Ghosh, Buffalo Grove, IL (US)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 14/615,141

(22) Filed: Feb. 5, 2015

(65) Prior Publication Data

US 2016/0233899 A1   Aug. 11, 2016

(51) Int. Cl.
*H04L 27/28* (2006.01)
*H04B 1/04* (2006.01)
(Continued)

(52) U.S. Cl.
CPC .............. *H04B 1/0483* (2013.01); *H04B 1/06* (2013.01); *H04L 1/0625* (2013.01); *H04L 1/0631* (2013.01); *H04L 1/0668* (2013.01); *H04L 5/0007* (2013.01); *H04L 27/265* (2013.01); *H04L 27/2614* (2013.01); *H04L 27/2627* (2013.01); *H04L 27/2628* (2013.01); *H04L 27/2649* (2013.01); *H04W 72/12* (2013.01)

(58) Field of Classification Search
CPC .............. H04L 27/2602; H04L 1/0041; H04L 2025/03414

USPC ......................................................... 375/260
See application file for complete search history.

(56) References Cited

U.S. PATENT DOCUMENTS

| | | | |
|---|---|---|---|
| 5,852,630 A * | 12/1998 | Langberg | H04L 27/2647 375/219 |
| 9,313,063 B1 * | 4/2016 | Jia | H04L 27/2605 |
| 2013/0136071 A1 * | 5/2013 | Han | H04L 5/0019 370/329 |

OTHER PUBLICATIONS

Berardinelli, et al. "On the Potential of Zero-Tail DFT-Spread-OFDM in 5G Networks," in Vehicular Technology Conference (VTC Fall), 2014 IEEE 80th, vol., No., pp. 1-6, Sep. 14-17, 2014.*
(Continued)

*Primary Examiner* — David S Huang
(74) *Attorney, Agent, or Firm* — Brake Hughes Bellermann LLP

(57) ABSTRACT

An example technique may include controlling receiving a first block of time domain symbols and a second block of time domain symbols, converting the blocks of time domain symbols to the frequency domain to create a first pre-equalized block of frequency domain symbols and a second pre-equalized block of frequency domain symbols, respectively, applying, a linear phase shift to the frequency domain symbols to compensate for a conjugating and time-reversing of corresponding pre-spread domain symbols being performed at a transmitter before spreading of the pre-spread domain symbols, and creating a first equalized block of frequency domain symbols and a second equalized block of frequency domain symbols as a function of the first and second pre-equalized blocks of frequency domain symbols wherein at least one of the first and second pre-equalized blocks of frequency domain symbols has the linear phase shift applied.

25 Claims, 10 Drawing Sheets

Transmitter 700 for Antenna Array 1 (Tx 1) - employing ZT-SOFDM (zero-tail-spread OFDM) with space-time encoding

(51) Int. Cl.
 H04L 1/06 (2006.01)
 H04L 27/26 (2006.01)
 H04B 1/06 (2006.01)
 H04L 5/00 (2006.01)
 H04W 72/12 (2009.01)

(56) References Cited

OTHER PUBLICATIONS

Alamouti, Siavash M., "A Simple Transmit Diversity Technique for Wireless Communications", IEEE Journal on Select Areas in Communications, vol. 16, No. 8, pp. 1451-1458, Oct. 1998.
Vook, Frederick W. et al., "Transmit Diversity Schemes for Broadband Mobile Communication Systems", 7 pages, Sep. 24, 2000.
Berardinelli, Gilberto et al., "Zero-tail DFT-spread-OFDM signals", 6 pages, 2013.
International Search Report and Written Opinion for International Application No. PCT/EP2016/052331, mailed May 17, 2016, 14 pages.
R1-105290; Texas Instruments; "On Transmit Diversity for PUCCH Format 3"; 3GPP TSG RAN WG1 #62bis; Xian, China, Oct. 11-15, 2010.
Ciochina, et al., "New PAPR-Preserving Mapping Methods for Single-Carrier FDMA with Space-Frequency Block Codes"; IEEE Transactions on Wireless Communications, vol. 8, No. 10, Oct. 2009; 11 pages.
Huang, et al., "Block Spread OFDMA with STC MIMO for Improved Frequency and Spatial Diversity over Broadband Wireless Access Uplink"; IEEE Communications Society subject matter experts for publication in the WCNC 2010 proceedings; IEEE 2010; 6 pages.

\* cited by examiner

300

Transmitter 700 for Antenna Array 1 (Tx 1) - employing ZT-SOFDM (zero-tail-spread OFDM) with space-time encoding Transmitter 800 for Antenna Array 2 (Tx 2) - employing ZT-SOFDM (zero-tail-spread OFDM) with space-time encoding

SPACE-TIME CODING FOR ZERO-TAIL SPREAD OFDM SYSTEM IN A WIRELESS NETWORK

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as user equipments (UE). LTE has included a number of improvements or developments.

In addition, many problems exist for 5G wireless networks. For example, some problems involve the use of antenna arrays, and the operation of space-time coding and modulation methods to be used for 5G wireless networks.

SUMMARY

According to an example implementation, a method may include generating a first group of K-$L_{CP}$ data symbols, conjugating and time-reversing the first group of K-$L_{CP}$ data symbols to generate a reversed-conjugated first group of data symbols, appending $N_P$ zeros before and $L_{CP}$-$N_P$ zeros after the reversed-conjugated first group of data symbols to generate a first block of pre-spread symbols, appending $N_P$ zeros before and $L_{CP}$-$N_P$ zeros after the first group of K-$L_{CP}$ data symbols to generate a second block of pre-spread symbols, spreading the pre-spread symbols for each of the first and second blocks of pre-spread symbols to create a first block of spread symbols and a second block of spread symbols, respectively, mapping, for each of the first and second blocks of spread symbols, each of the spread symbols to an occupied subcarrier, performing modulation on the first and second blocks of spread data symbols mapped to subcarriers to create a first block of time domain symbols and a second block of time domain symbols, respectively, transmitting the first block of time domain symbols via a first resource and transmitting the second block of time domain symbols via a second resource where the second resource is different from the first resource.

According to an example implementation, an apparatus may include at least one processor and at least one memory including computer instructions, when executed by the at least one processor, cause the apparatus to: generate a first group of K-$L_{CP}$ data symbols; conjugate and time-reversing the first group of K-$L_{CP}$ data symbols to generate a reversed-conjugated first group of data symbols; append $N_P$ zeros before and $L_{CP}$-$N_P$ zeros after the reversed-conjugated first group of data symbols to generate a first block of pre-spread symbols; append $N_P$ zeros before and $L_{CP}$-$N_P$ zeros after the first group of K-$L_{CP}$ data symbols to generate a second block of pre-spread symbols; spread the pre-spread symbols for each of the first and second blocks of pre-spread symbols to create a first block of spread symbols and a second block of spread symbols, respectively; map, for each of the first and second blocks of spread symbols, each of the spread symbols to an occupied subcarrier; perform modulation on the first and second blocks of spread data symbols mapped to subcarriers to create a first block of time domain symbols and a second block of time domain symbols, respectively; and transmit the first block of time domain symbols via a first resource and transmitting the second block of time domain symbols via a second resource where the second resource is different from the first resource.

According to another example implementation, a computer program product includes a computer-readable storage medium and storing executable code that, when executed by at least one data processing apparatus, is configured to cause the at least one data processing apparatus to perform a method including: generating a first group of K-$L_{CP}$ data symbols; conjugating and time-reversing the first group of K-$L_{CP}$ data symbols to generate a reversed-conjugated first group of data symbols; appending $N_P$ zeros before and $L_{CP}$-$N_P$ zeros after the reversed-conjugated first group of data symbols to generate a first block of pre-spread symbols; appending $N_P$ zeros before and $L_{CP}$-$N_P$ zeros after the first group of K-$L_{CP}$ data symbols to generate a second block of pre-spread symbols; spreading the pre-spread symbols for each of the first and second blocks of pre-spread symbols to create a first block of spread symbols and a second block of spread symbols, respectively; mapping, for each of the first and second blocks of spread symbols, each of the spread symbols to an occupied subcarrier; performing modulation on the first and second blocks of spread data symbols mapped to subcarriers to create a first block of time domain symbols and a second block of time domain symbols, respectively; and, transmitting the first block of time domain symbols via a first resource and transmitting the second block of time domain symbols via a second resource where the second resource is different from the first resource.

According to another example implementation, a method may include controlling receiving, in parallel during a symbol time interval, a first block of time domain symbols and a second block of time domain symbols; converting the first block of time domain symbols and the second block of time domain symbols to the frequency domain to create a first pre-equalized block of frequency domain symbols and a second pre-equalized block of frequency domain symbols, respectively; applying, for at least one of the first and second pre-equalized blocks of frequency domain symbols, a linear phase shift to the frequency domain symbols to compensate for a conjugating and time-reversing of corresponding pre-spread domain symbols being performed at a transmitter before spreading of the pre-spread domain symbols; and creating a first equalized block of frequency domain symbols and a second equalized block of frequency domain symbols as a function of the first and second pre-equalized blocks of frequency domain symbols wherein at least one of the first and second pre-equalized blocks of frequency domain symbols has the linear phase shift applied.

According to an example implementation, an apparatus may include at least one processor and at least one memory including computer instructions, when executed by the at least one processor, cause the apparatus to: control receiving, in parallel during a symbol time interval, a first block of time domain symbols and a second block of time domain symbols; convert the first block of time domain symbols and the second block of time domain symbols to the frequency domain to create a first pre-equalized block of frequency domain symbols and a second pre-equalized block of frequency domain symbols, respectively; apply, for at least one of the first and second pre-equalized blocks of frequency domain symbols, a linear phase shift to the frequency domain symbols to compensate for a conjugating and time-reversing of corresponding pre-spread domain symbols being performed at a transmitter before spreading of the pre-spread domain symbols; and create a first equalized block of frequency domain symbols and a second equalized block of frequency domain symbols as a function of the first and second pre-equalized blocks of frequency domain symbols wherein at least one of the first and second pre-equalized blocks of frequency domain symbols has the linear phase shift applied.

According to an example implementation, a computer program product includes a computer-readable storage medium and storing executable code that, when executed by at least one data processing apparatus, is configured to cause the at least one data processing apparatus to perform a method including: controlling receiving, in parallel during a symbol time interval, a first block of time domain symbols and a second block of time domain symbols; converting the first block of time domain symbols and the second block of time domain symbols to the frequency domain to create a first pre-equalized block of frequency domain symbols and a second pre-equalized block of frequency domain symbols, respectively; applying, for at least one of the first and second pre-equalized blocks of frequency domain symbols, a linear phase shift to the frequency domain symbols to compensate for a conjugating and time-reversing of corresponding pre-spread domain symbols being performed at a transmitter before spreading of the pre-spread domain symbols; and creating a first equalized block of frequency domain symbols and a second equalized block of frequency domain symbols as a function of the first and second pre-equalized blocks of frequency domain symbols wherein at least one of the first and second pre-equalized blocks of frequency domain symbols has the linear phase shift applied.

According to another example implementation, a method may include generating a first group of $K$-$L_{CP}$ data symbols and a second group of $K$-$L_{CP}$ data symbols; conjugating and time-reversing the first group of $K$-$L_{CP}$ data symbols to generate a reversed-conjugated first group of data symbols; appending $N_P$ zeros before and $L_{CP}$-$N_P$ zeros after the reversed-conjugated first group of data symbols to generate a first block of pre-spread symbols; appending $N_P$ zeros before and $L_{CP}$-$N_P$ zeros after the second group of $K$-$L_{CP}$ data symbols to generate a second block of pre-spread symbols; spreading the pre-spread symbols for each of the first and second blocks of pre-spread symbols to create a first block of spread symbols and a second block of spread symbols, respectively; mapping, for each of the first and second blocks of spread symbols, each of the spread symbols to an occupied subcarrier; performing an inverse Fast Fourier Transform on the first and second blocks of spread data symbols mapped to subcarriers to create a first block of time domain symbols and a second block of time domain symbols, respectively; transmitting the first block of time domain symbols via a first antenna array during a first OFDM (orthogonal frequency division multiplexing) symbol time and transmitting the second block of time domain symbols via the first antenna array during a second OFDM symbol time where the second OFDM symbol time is different from the first OFDM symbol time.

According to an example implementation, an apparatus may include at least one processor and at least one memory including computer instructions, when executed by the at least one processor, cause the apparatus to: generate a first group of $K$-$L_{CP}$ data symbols and a second group of $K$-$L_{CP}$ data symbols; conjugate and time-reverse the first group of $K$-$L_{CP}$ data symbols to generate a reversed-conjugated first group of data symbols; append $N_P$ zeros before and $L_{CP}$-$N_P$ zeros after the reversed-conjugated first group of data symbols to generate a first block of pre-spread symbols; append $N_P$ zeros before and $L_{CP}$-$N_P$ zeros after the second group of $K$-$L_{CP}$ data symbols to generate a second block of pre-spread symbols; spread the pre-spread symbols for each of the first and second blocks of pre-spread symbols to create a first block of spread symbols and a second block of spread symbols, respectively; map, for each of the first and second blocks of spread symbols, each of the spread symbols to an occupied subcarrier; perform an inverse Fast Fourier Transform on the first and second blocks of spread data symbols mapped to subcarriers to create a first block of time domain symbols and a second block of time domain symbols, respectively; transmit the first block of time domain symbols via a first antenna array during a first OFDM (orthogonal frequency division multiplexing) symbol time and transmitting the second block of time domain symbols via the first antenna array during a second OFDM symbol time where the second OFDM symbol time is different from the first OFDM symbol time.

The details of one or more examples of implementations are set forth in the accompanying drawings and the description below. Other features will be apparent from the description and drawings, and from the claims.

DETAILED DESCRIPTION

Figure 1:
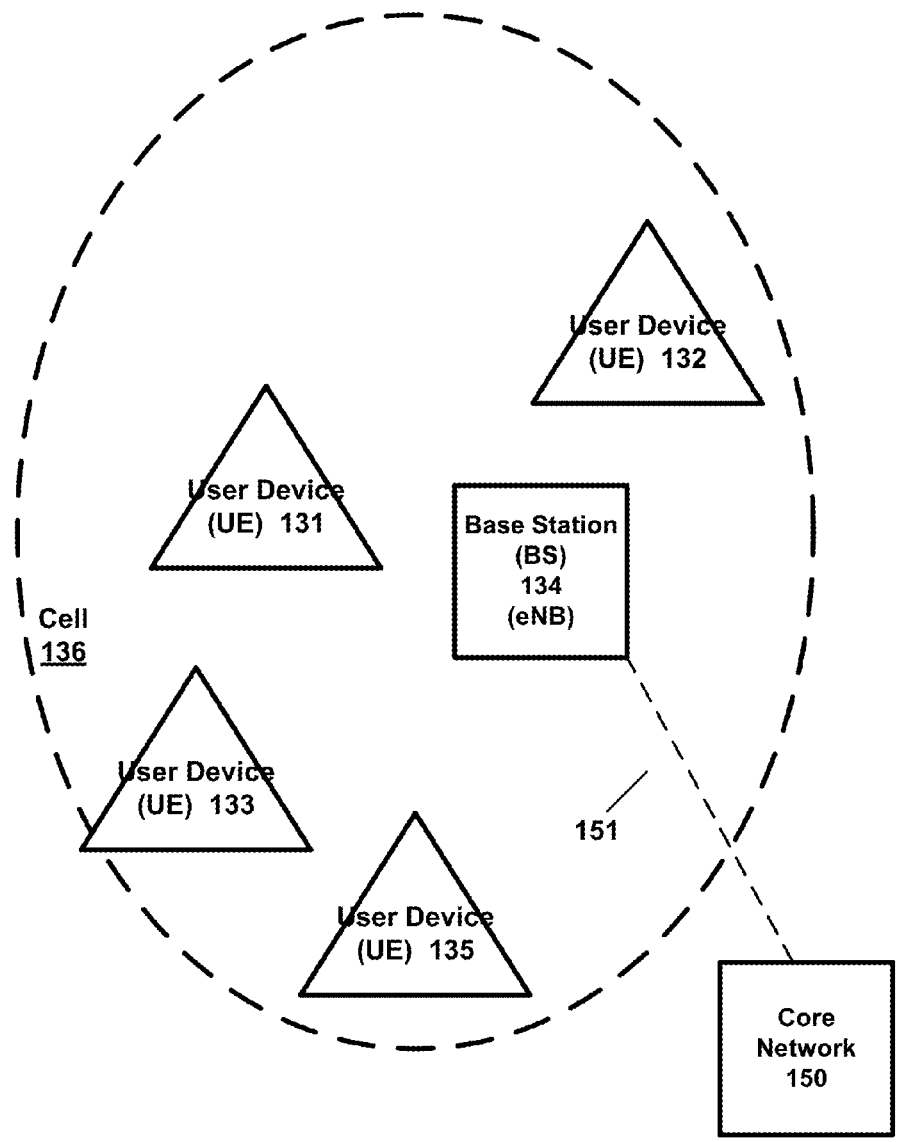
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as user equipments (UEs), may be connected (and in communication) with a base station (BS) 134, which may also be referred to as an enhanced Node B (eNB). At least part of the functionalities of a base station or (e)Node B (eNB) may be also be carried out by any node, server or host which may be operably coupled to a transceiver, such as a remote radio head. BS 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station, a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), the core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

Figure 2:
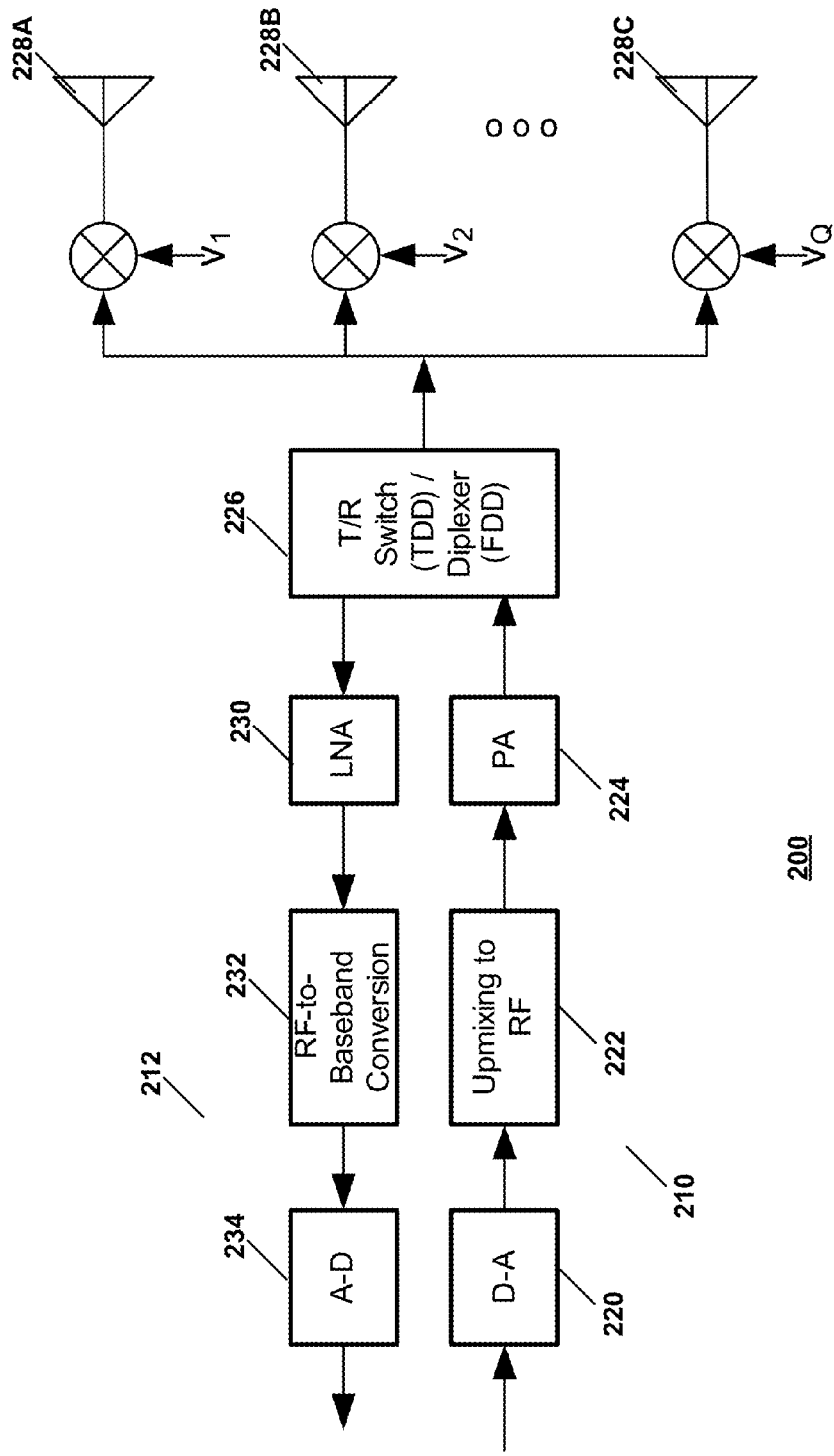
FIG. 2 is a diagram of a wireless transceiver according to an example implementation.

FIG. 2 is a diagram of a wireless transceiver according to an example implementation. Wireless transceiver 200 may be used, for example, at a base station (BS), e.g., Access Point or eNB, or other wireless device. Wireless transceiver 200 may include a transmit path 210 and a receive path 212.

In transmit path 210, a digital-to-analog converter (D-A) 220 may receive a digital signal from one or more applications and convert the digital signal to an analog signal. Upmixing block 222 may up-convert the analog signal to an RF (e.g., radio frequency) signal. Power amplifier (PA) 224 then amplifies the up-converted signal. The amplified signal is then passed through a transmit/receive (T/R) switch (or Diplexer 226 for frequency division duplexing, to change frequencies for transmitting). The signal output from T/R switch 226 is then output to one or more antennas in an array 228, such as to antennas 228A, 228B and/or 228C. Prior to being transmitted by one or more of the antennas in the array 228, a signal V1, V2, . . . or VQ is mixed with the signal to apply a gain and phase to the signal for transmission. For example, a gain and phase may be applied via each of signals V1, V2, . . . VQ to scale the signal transmitted by each antenna in the array, where the phase may be used to steer or point a beam transmitted by the antenna array, e.g., for omnidirectional beam steering.

In receive path 212 of wireless transceiver 200, a signal is received via antenna array 228, and is input to T/R switch 226, and then to a low noise amplifier (LNA) 230 to amplify the received signal. The amplified signal output by LNA 230 is then input to a RF-to-baseband conversion block 232 where the amplified RF signal is down-converted to baseband. An analog-to-digital (A-D) converter 234 then converts the analog baseband signal output by conversion block 232 to a digital signal for processing by one or more upper layers/application layers.

Figure 3:
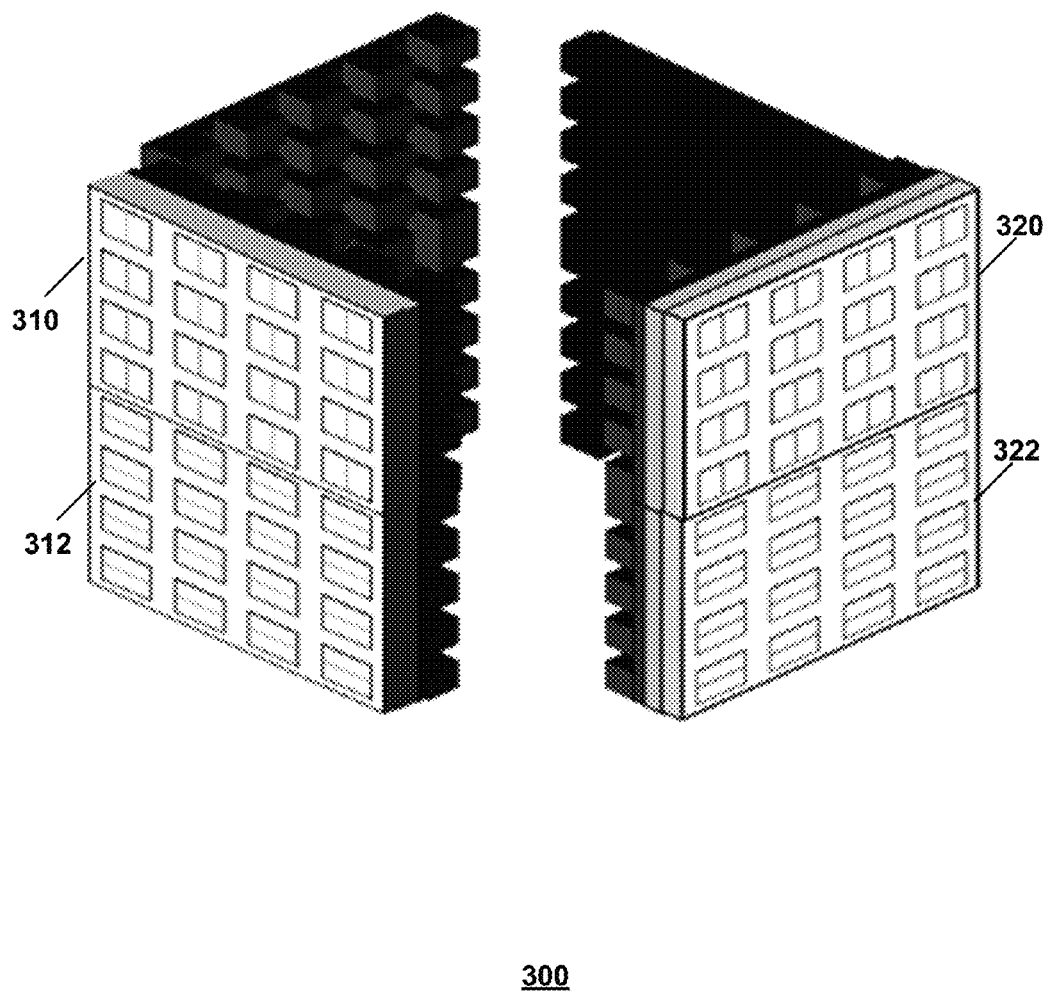
FIG. 3 is a diagram illustrating an antenna array 300 according to an example implementation.

FIG. 3 is a diagram illustrating an antenna array 300 according to an example implementation. For example, the antenna array 300 may be used for a BS, AP, eNB, or other wireless device. In one example implementation, RF antenna array 300 may include two 4×4 arrays (e.g., including arrays 310, 312, 320 and 322) per sector (4×4 array elements, with 16 elements total in each array in this example). In an example implementation, an upper array and a lower array may be provided for each sector, with each array including an array of 4×4 elements. For example, for antenna array 300, for a first sector, an upper array 310 (vertical polarization) and a lower array (horizontal polarization) 312 may be provided. And, for a second wireless sector, an upper array 320 (vertical polarization) and a lower array 322 (horizontal polarization) may be used.

Figure 4:
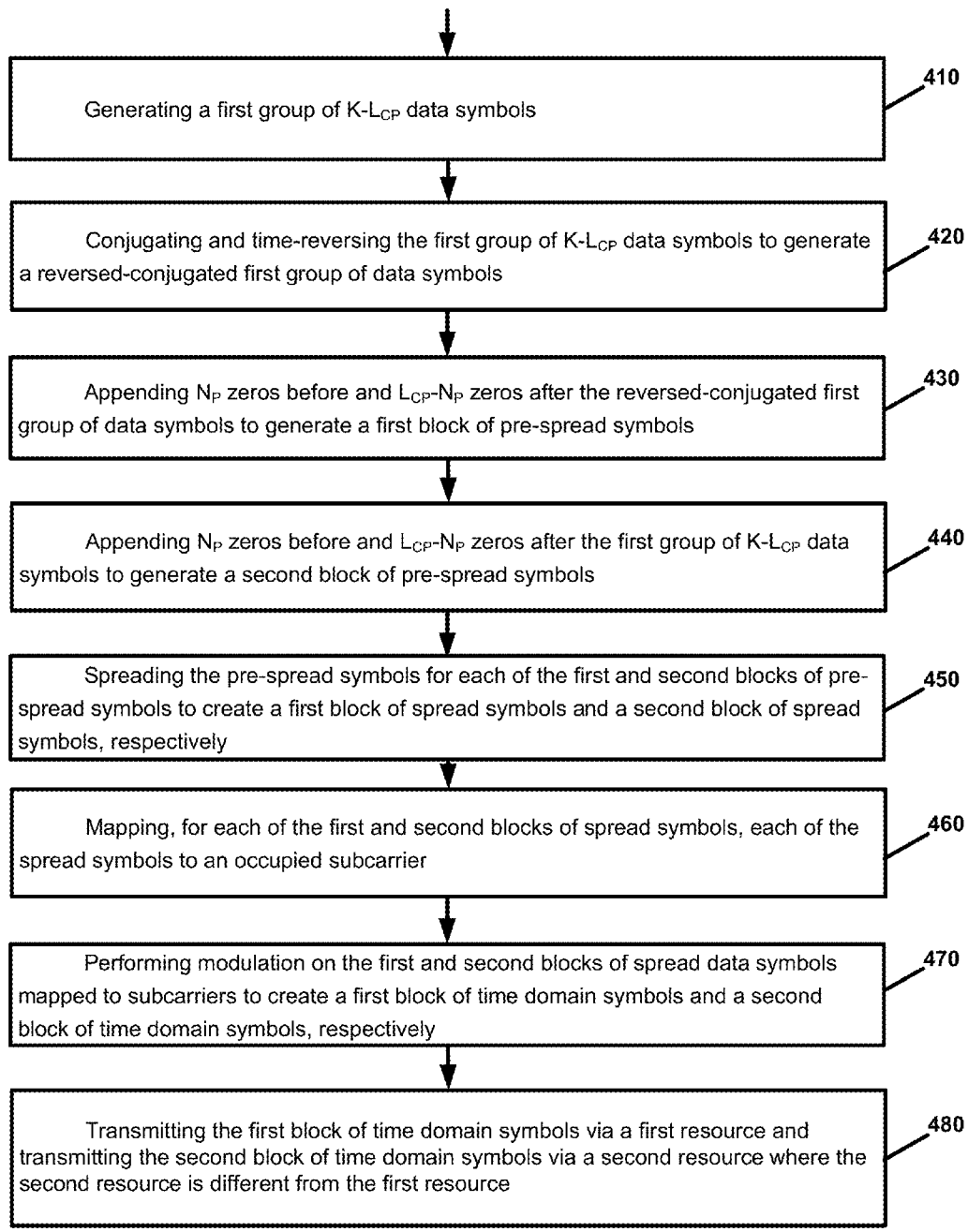
FIG. 4 is a flow chart illustrating operation of a wireless transmitter according to an example implementation.

FIG. 4 is a flow chart illustrating operation of a wireless transmitter according to an example implementation. Operation 410 may include generating a first group of K-$L_{CP}$ data symbols. Operation 420 may include conjugating and time-reversing the first group of K-$L_{CP}$ data symbols to generate a reversed-conjugated first group of data symbols. Operation 430 may include appending $N_P$ zeros before and $L_{CP}$-$N_P$ zeros after the reversed-conjugated first group of data symbols to generate a first block of pre-spread symbols. Operation 440 may include appending $N_P$ zeros before and $L_{CP}$-$N_P$ zeros after the first group of K-$L_{CP}$ data symbols to generate a second block of pre-spread symbols. Operation 450 may include spreading the pre-spread symbols for each of the first and second blocks of pre-spread symbols to create a first block of spread symbols and a second block of spread symbols, respectively. Operation 460 may include mapping, for each of the first and second blocks of spread symbols, each of the spread symbols to an occupied subcarrier. Operation 470 may include performing modulation on the first and second blocks of spread data symbols mapped to subcarriers to create a first block of time domain symbols and a second block of time domain symbols, respectively. And, operation 480 may include transmitting the first block of time domain symbols via a first resource and transmitting the second block of time domain symbols via a second resource where the second resource is different from the first resource.

According to an example implementation, the transceiver (and/or the transmitting and/or receiver, or one or more operations performed by a transmitter and/or receiver) may include (or may use) a single antenna array (or a single antenna), or may use multiple antennas (multiple antenna arrays), such as for example, two antennas/two antenna arrays.

According to an example implementation of the method of FIG. 4, the transmitting may include transmitting the first block of time domain symbols via a first antenna array via a first resource and transmitting the second block of time domain symbols via a second antenna array via a second resource where the second resource is different from the first resource, and where the second antenna array is different from the first antenna array.

According to an example implementation of the method of FIG. 4, the performing modulation may include performing OFDM (orthogonal frequency division multiplex) modulation on the first and second blocks of spread data symbols mapped to subcarriers to create a first block of time domain symbols and a second block of time domain symbols, respectively.

According to an example implementation of the method of FIG. 4, the performing modulation may include performing an inverse Fast Fourier Transform (IFFT) on the first and second blocks of spread data symbols mapped to subcarriers to create a first block of time domain symbols and a second block of time domain symbols, respectively.

According to an example implementation of the method of FIG. 4, the first resource may include a first OFDM symbol time, and the second resource may include a second OFDM symbol time.

According to an example implementation of the method of FIG. 4, the first resource may include a first frequency resource or a first subcarrier, and the second resource may include a second frequency resource or a second subcarrier.

According to an example implementation of the method of FIG. 4, the conjugating and time-reversing may including conjugating, time-reversing and negating at least the first group of $K-L_{CP}$ data symbols to generate a reversed-conjugated first group of data symbols.

According to an example implementation of the method of FIG. 4, the spreading may include spreading the pre-spread symbols for each of the first and second blocks of pre-spread symbols via a Discrete Fourier Transform or Fast Fourier Transform to create a first block of spread symbols and a second block of spread symbols, respectively.

According to an example implementation of the method of FIG. 4, the zeros appended before and after the reversed-conjugated first group of data symbols creates, in the first block of time domain symbols, a first number of near-zero symbols before and a second number of near-zero symbols after a plurality of non-zero time domain data symbols.

According to an example implementation of the method of FIG. 4, pair-wise space-time coding transmission across frequency is employed in which two groups of data symbols are transmitted via the first resource and via the second resource.

According to an example implementation of the method of FIG. 4, the method may further include conjugating and time-reversing the second group of $K-L_{CP}$ data symbols to generate a reversed-conjugated second group of data symbols; and wherein the appending $N_P$ zeros before and $L_{CP}-N_P$ zeros after the second group of $K-L_{CP}$ data symbols includes appending $N_P$ zeros before and $L_{CP}-N_P$ zeros after the reversed-conjugated second group of $K-L_{CP}$ data symbols to generate a second block of pre-spread symbols.

According to an example implementation, an apparatus may include at least one processor and at least one memory including computer instructions, when executed by the at least one processor, cause the apparatus to: generate a first group of $K-L_{CP}$ data symbols; conjugate and time-reversing the first group of $K-L_{CP}$ data symbols to generate a reversed-conjugated first group of data symbols; append $N_P$ zeros before and $L_{CP}-N_P$ zeros after the reversed-conjugated first group of data symbols to generate a first block of pre-spread symbols; append $N_P$ zeros before and $L_{CP}-N_P$ zeros after the first group of $K-L_{CP}$ data symbols to generate a second block of pre-spread symbols; spread the pre-spread symbols for each of the first and second blocks of pre-spread symbols to create a first block of spread symbols and a second block of spread symbols, respectively; map, for each of the first and second blocks of spread symbols, each of the spread symbols to an occupied subcarrier; perform modulation on the first and second blocks of spread data symbols mapped to subcarriers to create a first block of time domain symbols and a second block of time domain symbols, respectively; and transmit the first block of time domain symbols via a first resource and transmitting the second block of time domain symbols via a second resource where the second resource is different from the first resource.

According to an example implementation, the instructions causing the apparatus to perform modulation may include causing the apparatus to perform an inverse Fast Fourier Transform (IFFT) on the first and second blocks of spread data symbols mapped to subcarriers to create a first block of time domain symbols and a second block of time domain symbols, respectively.

According to an example implementation, the first resource may include a first OFDM symbol time, and the second resource may include a second OFDM symbol time.

According to an example implementation, the first resource may include a first frequency resource or a first subcarrier, and the second resource may include a second frequency resource or a second subcarrier.

According to an example implementation, the instructions causing the apparatus to conjugate and time-reverse may include causing the apparatus to conjugate, time-reverse and negate at least the first group of $K-L_{CP}$ data symbols to generate a reversed-conjugated first group of data symbols.

According to an example implementation, the instructions causing the apparatus to spread may includes causing the apparatus to spread the pre-spread symbols for each of the first and second blocks of pre-spread symbols via a Discrete Fourier Transform or Fast Fourier Transform to create a first block of spread symbols and a second block of spread symbols, respectively.

According to another example implementation, a computer program product may include a computer-readable storage medium and storing executable code that, when executed by at least one data processing apparatus, is configured to cause the at least one data processing apparatus to perform a method including: generating a first group of $K-L_{CP}$ data symbols; conjugating and time-reversing the first group of $K-L_{CP}$ data symbols to generate a reversed-conjugated first group of data symbols; appending $N_P$ zeros before and $L_{CP}-N_P$ zeros after the reversed-conjugated first group of data symbols to generate a first block of pre-spread symbols; appending $N_P$ zeros before and $L_{CP}-N_P$ zeros after the first group of $K-L_{CP}$ data symbols to generate a second block of pre-spread symbols; spreading the pre-spread symbols for each of the first and second blocks of pre-spread symbols to create a first block of spread symbols and a second block of spread symbols, respectively; mapping, for each of the first and second blocks of spread symbols, each of the spread symbols to an occupied subcarrier; performing modulation on the first and second blocks of spread data symbols mapped to subcarriers to create a first block of time domain symbols and a second block of time domain symbols, respectively; transmitting the first block of time domain symbols via a first resource and transmitting the second block of time domain symbols via a second resource where the second resource is different from the first resource.

According to an example implementation, an apparatus may include means (1004 and/or 1002A/1002B) for generating a first group of $K-L_{CP}$ data symbols, means (1004 and/or 1002A/1002B) for conjugating and time-reversing the first group of $K-L_{CP}$ data symbols to generate a reversed-conjugated first group of data symbols, means (1004 and/or 1002A/1002B) for appending $N_P$ zeros before and $L_{CP}-N_P$ zeros after the reversed-conjugated first group of data symbols to generate a first block of pre-spread symbols, means (1004 and/or 1002A/1002B) for appending $N_P$ zeros before and $L_{CP}-N_P$ zeros after the first group of $K-L_{CP}$ data symbols to generate a second block of pre-spread symbols, means (1004 and/or 1002A/1002B) for spreading the pre-spread symbols for each of the first and second blocks of pre-spread symbols to create a first block of spread symbols and a second block of spread symbols, respectively, means (1004 and/or 1002A/1002B) for mapping, for each of the first and second blocks of spread symbols, each of the spread symbols to an occupied subcarrier, means (1004 and/or 1002A/1002B) for performing modulation on the first and second blocks of spread data symbols mapped to subcarriers to create a first block of time domain symbols and a second block of time domain symbols, respectively, and means (1004 and/or 1002A/1002B) for transmitting the first block of time domain symbols via a first resource and transmitting the second block of time domain symbols via a second resource where the second resource is different from the first resource.

According to an example implementation, the transceiver (and/or the transmitting and/or receiver, or one or more operations performed by a transmitter and/or receiver) may include (or may use) a single antenna array (or a single antenna), or may use multiple antennas (multiple antenna arrays), such as for example, two antennas/two antenna arrays.

According to an example implementation of the apparatus, the means for transmitting may include means (1004 and/or 1002A/1002B) for transmitting the first block of time domain symbols via a first antenna array via a first resource and transmitting the second block of time domain symbols via a second antenna array via a second resource where the second resource is different from the first resource, and where the second antenna array is different from the first antenna array.

According to an example implementation of the apparatus, the means for performing modulation may include means (1004 and/or 1002A/1002B) for performing OFDM (orthogonal frequency division multiplex) modulation on the first and second blocks of spread data symbols mapped to subcarriers to create a first block of time domain symbols and a second block of time domain symbols, respectively.

According to an example implementation of the apparatus, the means for performing modulation may include means (1004 and/or 1002A/1002B) for performing an inverse Fast Fourier Transform (IFFT) on the first and second blocks of spread data symbols mapped to subcarriers to create a first block of time domain symbols and a second block of time domain symbols, respectively.

According to an example implementation of the apparatus, the first resource may include a first OFDM symbol time, and the second resource may include a second OFDM symbol time.

According to an example implementation of the apparatus, the first resource may include a first frequency resource or a first subcarrier, and the second resource may include a second frequency resource or a second subcarrier.

According to an example implementation of the apparatus, the means for conjugating and time-reversing may including means (1004 and/or 1002A/1002B) for conjugating, time-reversing and negating at least the first group of K-$L_{CP}$ data symbols to generate a reversed-conjugated first group of data symbols.

According to an example implementation of the apparatus, the means for spreading may include means (1004 and/or 1002A/1002B) for spreading the pre-spread symbols for each of the first and second blocks of pre-spread symbols via a Discrete Fourier Transform or Fast Fourier Transform to create a first block of spread symbols and a second block of spread symbols, respectively.

According to an example implementation of the apparatus, the zeros appended before and after the reversed-conjugated first group of data symbols creates, in the first block of time domain symbols, a first number of near-zero symbols before and a second number of near-zero symbols after a plurality of non-zero time domain data symbols.

According to an example implementation of the apparatus, a means (1004 and/or 1002A/1002B) for pair-wise space-time coding transmission across frequency is employed in which two groups of data symbols are transmitted via the first resource and via the second resource.

According to an example implementation of the apparatus, the apparatus may further include means (1004 and/or 1002A/1002B) for conjugating and time-reversing the second group of K-$L_{CP}$ data symbols to generate a reversed-conjugated second group of data symbols; and wherein the means for appending $N_P$ zeros before and $L_{CP}$-$N_P$ zeros after the second group of K-$L_{CP}$ data symbols includes means (1004 and/or 1002A/1002B) for appending $N_P$ zeros before and $L_{CP}$-$N_P$ zeros after the reversed-conjugated second group of K-$L_{CP}$ data symbols to generate a second block of pre-spread symbols.

Figure 5:
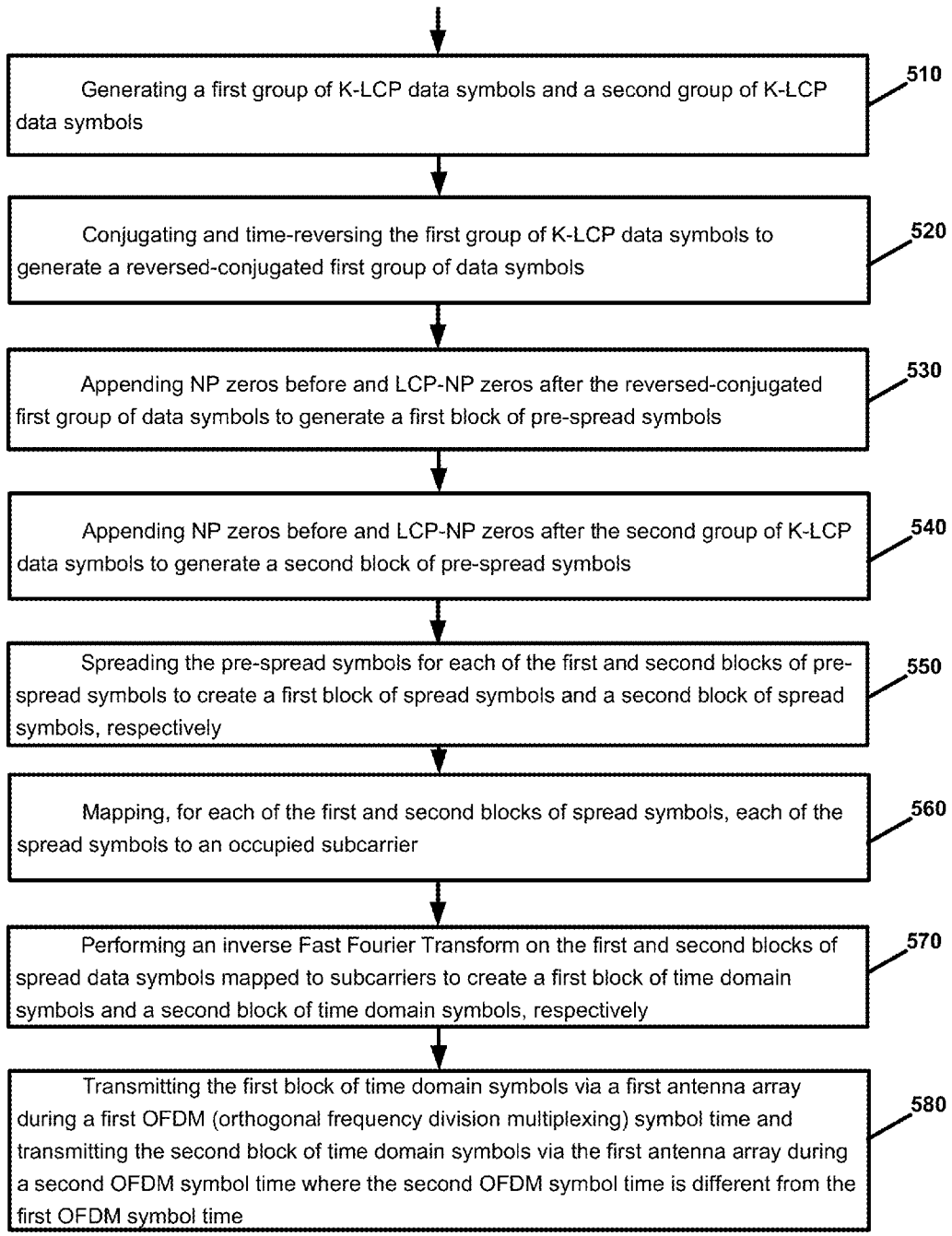
FIG. 5 is a flow chart illustrating operation of a wireless transmitter according to another example implementation.

FIG. 5 is a flow chart illustrating operation of a wireless transmitter according to another example implementation. Operation 510 may include generating a first group of K-$L_{CP}$ data symbols and a second group of K-$L_{CP}$ data symbols. Operation 520 may include conjugating and time-reversing the first group of K-$L_{CP}$ data symbols to generate a reversed-conjugated first group of data symbols. Operation 530 may include appending $N_P$ zeros before and $L_{CP}$-$N_P$ zeros after the reversed-conjugated first group of data symbols to generate a first block of pre-spread symbols. Operation 540 may include appending $N_P$ zeros before and $L_{CP}$-$N_P$ zeros after the second group of K-$L_{CP}$ data symbols to generate a second block of pre-spread symbols. Operation 550 may include spreading the pre-spread symbols for each of the first and second blocks of pre-spread symbols to create a first block of spread symbols and a second block of spread symbols, respectively. Operation 560 may include mapping, for each of the first and second blocks of spread symbols, each of the spread symbols to an occupied subcarrier. Operation 570 may include performing an inverse Fast Fourier Transform on the first and second blocks of spread data symbols mapped to subcarriers to create a first block of time domain symbols and a second block of time domain symbols, respectively. Operation 580 may include transmitting the first block of time domain symbols via a first antenna array during a first OFDM (orthogonal frequency division multiplexing) symbol time and transmitting the second block of time domain symbols via the first antenna array during a second OFDM symbol time where the second OFDM symbol time is different from the first OFDM symbol time.

According to an example implementation, an apparatus may include at least one processor and at least one memory including computer instructions, when executed by the at least one processor, cause the apparatus to: generate a first group of K-$L_{CP}$ data symbols and a second group of K-$L_{CP}$ data symbols; conjugate and time-reverse the first group of K-$L_{CP}$ data symbols to generate a reversed-conjugated first group of data symbols; append $N_P$ zeros before and $L_{CP}$-$N_P$ zeros after the reversed-conjugated first group of data symbols to generate a first block of pre-spread symbols; append $N_P$ zeros before and $L_{CP}$-$N_P$ zeros after the second group of K-$L_{CP}$ data symbols to generate a second block of pre-spread symbols; spread the pre-spread symbols for each of the first and second blocks of pre-spread symbols to create a first block of spread symbols and a second block of spread symbols, respectively; map, for each of the first and second blocks of spread symbols, each of the spread symbols to an occupied subcarrier; perform an inverse Fast Fourier Transform on the first and second blocks of spread data symbols mapped to subcarriers to create a first block of time domain symbols and a second block of time domain symbols, respectively; transmit the first block of time domain symbols via a first antenna array during a first OFDM (orthogonal frequency division multiplexing) symbol time and transmitting the second block of time domain symbols via the first antenna array during a second OFDM symbol time where the second OFDM symbol time is different from the first OFDM symbol time.

According to an example implementation, an apparatus may include means (1004 and/or 1002A/1002B) for generating a first group of K-$L_{CP}$ data symbols and a second group of K-$L_{CP}$ data symbols, means (1004 and/or 1002A/1002B) for conjugating and time-reversing the first group of K-$L_{CP}$ data symbols to generate a reversed-conjugated first group of data symbols, means (1004 and/or 1002A/1002B) for appending $N_P$ zeros before and $L_{CP}$-$N_P$ zeros after the reversed-conjugated first group of data symbols to generate a first block of pre-spread symbols, means (1004 and/or 1002A/1002B) for appending $N_P$ zeros before and $L_{CP}$-$N_P$ zeros after the second group of K-$L_{CP}$ data symbols to generate a second block of pre-spread symbols, means (1004 and/or 1002A/1002B) for spreading the pre-spread symbols for each of the first and second blocks of pre-spread symbols to create a first block of spread symbols and a second block of spread symbols, respectively, means (1004 and/or 1002A/1002B) for mapping, for each of the first and second blocks of spread symbols, each of the spread symbols to an occupied subcarrier, means (1004 and/or 1002A/1002B) for performing an inverse Fast Fourier Transform on the first and second blocks of spread data symbols mapped to subcarriers to create a first block of time domain symbols and a second block of time domain symbols, respectively, and means (1004 and/or 1002A/1002B) for transmitting the first block of time domain symbols via a first antenna array during a first OFDM (orthogonal frequency division multiplexing) symbol time and means (1004 and/or 1002A/1002B) for transmitting the second block of time domain symbols via the first antenna array during a second OFDM symbol time where the second OFDM symbol time is different from the first OFDM symbol time.

Figure 6:
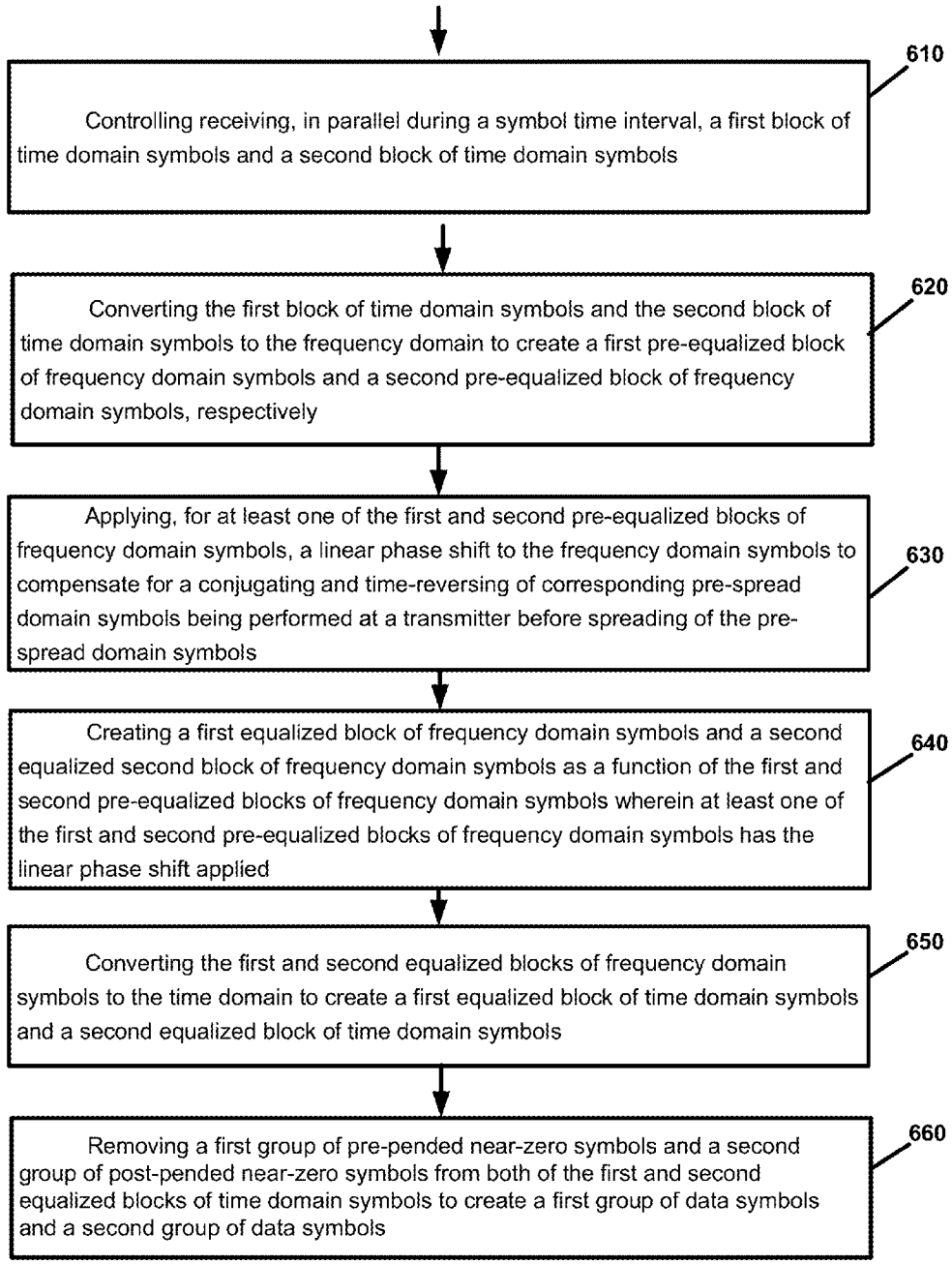
FIG. 6 is a flow chart illustrating operation of a wireless receiver according to an example implementation.

FIG. 6 is a flow chart illustrating operation of a wireless receiver according to an example implementation. Operation 610 may include controlling receiving, in parallel during a symbol time interval, a first block of time domain symbols and a second block of time domain symbols. Operation 620 may include converting the first block of time domain symbols and the second block of time domain symbols to the frequency domain to create a first pre-equalized block of frequency domain symbols and a second pre-equalized block of frequency domain symbols, respectively. Operation 630 may include applying, for at least one of the first and second pre-equalized blocks of frequency domain symbols, a linear phase shift to the frequency domain symbols to compensate for a conjugating and time-reversing of corresponding pre-spread domain symbols being performed at a transmitter before spreading of the pre-spread domain symbols. And, operation 640 may include creating a first equalized block of frequency domain symbols and a second equalized second block of frequency domain symbols as a function of the first and second pre-equalized blocks of frequency domain symbols wherein at least one of the first and second pre-equalized blocks of frequency domain symbols has the linear phase shift applied.

According to an example implementation of the method of FIG. 6, the method may further include the following operations: Operation 650 includes converting the first and second equalized blocks of frequency domain symbols to the time domain to create a first equalized block of time domain symbols and a second equalized block of time domain symbols. And, operation 660 includes removing a first group of pre-pended near-zero symbols and a second group of post-pended near-zero symbols from both of the first and second equalized blocks of time domain symbols to create a first group of data symbols and a second group of data symbols. For example, these first and second groups of data symbols may be estimates of the sent/transmitted data symbols.

According to an example implementation of the method of FIG. 6, the converting may include converting the first block of time domain symbols and the second block of time domain symbols to the frequency domain via a Fourier Transform to create a first pre-equalized block of frequency domain symbols and a second pre-equalized block of frequency domain symbols, respectively.

According to an example implementation of the method of FIG. 6, an amount of the linear phase shift applied to the frequency domain symbols is based on a number of the first group of pre-pended near-zero symbols and a number of the second group of post-pended near-zero value symbols.

According to another example implementation, an apparatus may include at least one processor and at least one memory including computer instructions, when executed by the at least one processor, cause the apparatus to: control receiving, in parallel during a symbol time interval, a first block of time domain symbols and a second block of time domain symbols; convert the first block of time domain symbols and the second block of time domain symbols to the frequency domain to create a first pre-equalized block of frequency domain symbols and a second pre-equalized block of frequency domain symbols, respectively; apply, for at least one of the first and second pre-equalized blocks of frequency domain symbols, a linear phase shift to the frequency domain symbols to compensate for a conjugating and time-reversing of corresponding pre-spread domain symbols being performed at a transmitter before spreading of the pre-spread domain symbols; and create a first equalized block of frequency domain symbols and a second equalized block of frequency domain symbols as a function of the first and second pre-equalized blocks of frequency domain symbols wherein at least one of the first and second pre-equalized blocks of frequency domain symbols has the linear phase shift applied.

According to an example implementation, the instructions may further cause the apparatus to: convert the first and second equalized blocks of frequency domain symbols to the time domain to create a first equalized block of time domain symbols and a second equalized block of time domain symbols; and remove a first group of pre-pended near-zero symbols and a second group of post-pended near-zero symbols from both of the first and second equalized blocks of time domain symbols to create a first group of data symbols and a second group of data symbols. For example, these first and second groups of data symbols may be estimates of the sent/transmitted data symbols.

According to another example implementation, the instructions causing the apparatus to convert may include causing the apparatus to: convert the first block of time domain symbols and the second block of time domain symbols to the frequency domain via a Fourier Transform to create a first pre-equalized block of frequency domain symbols and a second pre-equalized block of frequency domain symbols, respectively.

According to an example implementation, an amount of the linear phase shift applied to the frequency domain symbols is based on a number of the first group of pre-pended near-zero symbols and a number of the second group of post-pended near-zero value symbols.

According to an example implementation, a computer program product may include a computer-readable storage medium and storing executable code that, when executed by at least one data processing apparatus, is configured to cause the at least one data processing apparatus to perform a method including: controlling receiving, in parallel during a symbol time interval, a first block of time domain symbols and a second block of time domain symbols; converting the first block of time domain symbols and the second block of time domain symbols to the frequency domain to create a first pre-equalized block of frequency domain symbols and a second pre-equalized block of frequency domain symbols, respectively; applying, for at least one of the first and second pre-equalized blocks of frequency domain symbols, a linear phase shift to the frequency domain symbols to compensate for a conjugating and time-reversing of corresponding pre-spread domain symbols being performed at a transmitter before spreading of the pre-spread domain symbols; and creating a first equalized block of frequency domain symbols and a second equalized block of frequency domain symbols as a function of the first and second pre-equalized blocks of frequency domain symbols wherein at least one of the first and second pre-equalized blocks of frequency domain symbols has the linear phase shift applied.

According to an example implementation, an apparatus may include means (1004 and/or 1002A/1002B) for controlling receiving, in parallel during a symbol time interval, a first block of time domain symbols and a second block of time domain symbols, means (1004 and/or 1002A/1002B) for converting the first block of time domain symbols and the second block of time domain symbols to the frequency domain to create a first pre-equalized block of frequency domain symbols and a second pre-equalized block of frequency domain symbols, respectively, means (1004 and/or 1002A/1002B) for applying, for at least one of the first and second pre-equalized blocks of frequency domain symbols, a linear phase shift to the frequency domain symbols to compensate for a conjugating and time-reversing of corresponding pre-spread domain symbols being performed at a transmitter before spreading of the pre-spread domain symbols, means (1004 and/or 1002A/1002B) for creating a first equalized block of frequency domain symbols and a second equalized second block of frequency domain symbols as a function of the first and second pre-equalized blocks of frequency domain symbols wherein at least one of the first and second pre-equalized blocks of frequency domain symbols has the linear phase shift applied.

According to an example implementation of the apparatus, the apparatus may further include the following: means (1004 and/or 1002A/1002B) for converting the first and second equalized blocks of frequency domain symbols to the time domain to create a first equalized block of time domain symbols and a second equalized block of time domain symbols, and means (1004 and/or 1002A/1002B) for removing a first group of pre-pended near-zero symbols and a second group of post-pended near-zero symbols from both of the first and second equalized blocks of time domain symbols to create a first group of data symbols and a second group of data symbols. For example, these first and second groups of data symbols may be estimates of the sent/transmitted data symbols.

According to an example implementation of the apparatus, the means for converting may include means (1004 and/or 1002A/1002B) for converting the first block of time domain symbols and the second block of time domain symbols to the frequency domain via a Fourier Transform to create a first pre-equalized block of frequency domain symbols and a second pre-equalized block of frequency domain symbols, respectively.

According to an example implementation of the apparatus, an amount of the linear phase shift applied to the frequency domain symbols is based on a number of the first group of pre-pended near-zero symbols and a number of the second group of post-pended near-zero value symbols.

According to an example implementation, a symbol may be a state of a carrier (or state of a carrier signal). For example, a symbol may be defined as having a specific phase, magnitude (or amplitude), and/or frequency, or a symbol may be defined, for example, with an amplitude and phase. As used herein, lower case letters, e.g., s(k,b), typically refer to time-domain symbols or values, whereas uppercase letters, e.g., S(k,b), typically refer to frequency domain symbols or values. An asterisk (*) may indicate a complex conjugate of a symbol or value. A complex number may have a real part and an imaginary part (which may also be represented as an amplitude and phase). A complex conjugate of a first number has the same real part of the first number, and an imaginary part of equal magnitude but opposite sign as the first number. As an example, for a complex number z=x+iy, the complex conjugate of z may be defined to be z*=x−iy, as an illustrative example.

In addition, Alamouti space-time coding (also referred to as space-time block coding, or space-time coding) may refer to a technique used in wireless communications to transmit multiple copies of a data stream across a plurality of antennas and to exploit the various transmitted versions of the data to improve the reliability of data-transfer. Thus, the space-time coding may include multiple transmit antennas (spatial diversity), and may transmit data from the antennas in pairs or pairs of blocks, e.g., for two antennas. Alamouti space-time coding is typically performed on time domain symbols, e.g., space-time coding (including conjugation and time swapping of adjacent time domain symbols) is typically done for time-domain symbols.

According to an illustrative example implementation, an Alamouti (or Alamouti-type) space-time coding may be provided for a ZT-SOFDM (zero tail-spread orthogonal frequency division multiplexing) system through conjugation and time-reversal of a (or at least one) block of ZT-SOFDM symbols in the pre-spread domain (e.g., space-time coding through conjugation and time reversal of pre-spread domain symbols). The description is written, as an illustrative example, for an Alamouti two-antenna space-time code, but the various techniques described herein may be applied to other space-time codes as well (e.g., for more than two antennas), such as for four antennas/antenna arrays. According to an illustrative example implementation, the examples may be applicable to various wireless networks, such as for 5G, and may include two or more antennas. The two antennas may be implemented, for example, as two RF antenna arrays with orthogonal polarizations (horizontal and vertical polarizations, see FIG. 3) where the RF beams on each antenna array may employ omni-directional or near-omni-directional beams. In this way the combination of omni-directional beams and space-time coding across two cross-polar arrays may create a composite transmitted signal which is omni-directional. This omni-directional transmission may, for example, be useful in 5G for some broadcast transmissions, e.g., such as for broadcast control channels and/or other transmissions. Additionally the RF beams may employ directional beamforming across the two cross-polar arrays to create a direction signal to a UE to improve the reliability of the link transmission. Note that when the term "antenna array" is used, the array can refer to an array made up of a single antenna or an array made up of multiple antennas.

According to example implementations, an example operation of ZT-SOFDM (zero tail-spread orthogonal frequency division multiplexing) and Alamouti space-time coding will be briefly described, followed by explanations of further example implementations.

According to an example implementation of ZT-SOFDM, there may be, for example, $K-L_{CP}$ data symbols to be transmitted at a given OFDM symbol time where K is the number of occupied subcarriers and $L_{CP}$ is the cyclic prefix length in the pre-spread domain. Note that the cyclic prefix length of the actual ZT-SOFDM signal (i.e., the cyclic prefix length of the transmitted time-domain signal) will be $N \times L_{CP}/K$ symbols where N is the FFT (Fast Fourier Transform) size of the OFDM signal (e.g., N=1024). In a block of ZT-SOFDM pre-spread symbols (where a block means an OFDM symbol time) there may be $N_P$ (e.g., $N_P=3$) zeros appended before the $K-L_{CP}$ data symbols and $L_{CP}-N_P$ zeros appended after the group of $K-L_{CP}$ data symbols (to provide a total of $L_{CP}$ zeros appended to a group of $K-L_{CP}$ data symbols to provide block of pre-spread OFDM symbols). $L_{CP}$ is a length of a cyclic prefix in the pre-spread domain. A block of ZT-SOFDM symbols before DFT spreading (i.e., the ZT-SOFDM pre-spread symbols) on a given OFDM block of symbols, b, is given as shown by Eqn. 1:

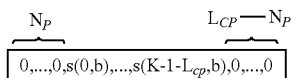

Eqn. 1 - ZT-SOFDM pre-DFT
(pre-spread) block of symbols,
s(k,b), where k is symbol within
the block and b is symbol block time.

Where s(0,b) through $s(K-L_{CP}-1,b)$ are the $K-L_{CP}$ data symbols on block b, where b identifies the symbol block time of the OFDM symbol. According to an example implementation, this block of pre-spread symbols may be spread with a DFT or a K-point FFT, and then mapped to the OFDM occupied subcarriers. After the spreading, e.g., via DFT or FFT, an N-point IFFT (Inverse Fast Fourier Transform) may be performed on the block of spread symbols to generate the time-domain transmitted symbols for block b, x(n,b).

Note that after the N-point IFFT that $x(b)=[x(0,b), \ldots, x(N-1,b)]^T$ is the block of time-domain samples to be transmitted, as shown by Eqn. 2 (below). In an example implementation, the addition of $N_P$ zeros in the block of symbols before the K-point DFT spreading (see the leftmost zeros of the appended zeros in Eqn. 1) creates $N_P'=N \times N_P/K$ near-zero symbols before regular-power symbols, where × in this equation for $N_P'$ refers to a multiplication operator. By near-zero, for example, it means that the symbols may typically have very low power (e.g., at least 10 dB lower, and typically 20 dB or more lower than the regular-power symbols) and thus for signal processing purposes can be thought of as actually being zero. The addition of the $L_{CP}-N_P$ zeros in the block of symbols before the K-point DFT spreading creates $L_{CP}'-N_P'$ (where $L_{CP}'=N \times L_{CP}/K$ and × in this equation for $L_{CP}'$ refers to a multiplication operator) near-zero symbols after the regular-power symbols, as shown by Eqn. 2 below.

The combination of the two sets of zeros ($N_P'$ near-zero symbols before the regular power symbols, and $L_{CP}'-N_P'$ near-zero symbols after the regular-power symbols) gives a total cyclic prefix length of $L_{CP}'$ which then can accommodate channels of length $L_{CP}'$ or less for equalization purposes. In other words the total cyclic prefix length includes the near-zero symbols before and after the regular-power symbols. For example, a cyclic prefix may be added to a transmitted data block to provide a guard period to prevent inter-symbol interference. The ZT-SOFDM receiver may reverse the process.

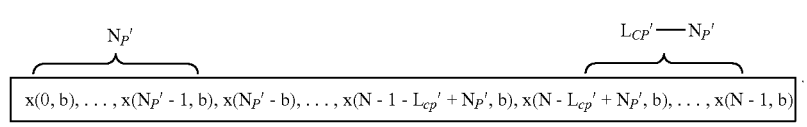

Eqn. 2

ZT-SOFDM block of time-domain symbols after the N-point IFFT.

As noted above, Alamouti space-time coding is typically performed in the time domain, i.e., on time domain symbols/transmissions. According to an example implementation, an Alamouti space-time code may be adapted to frequency-domain transmissions as follows. The Alamouti space-time code typically uses two antennas to orthogonally code two data symbols on different OFDM symbol times. Also, according to an example implementation, the Alamouti coding can be done across frequency as well. For RF (radio frequency) beamforming, an antenna of the Alamouti space-time code will be an RF beam applied to the RF antenna array.

In the following description of space-time coding, the (capital) letters, X( ), Y( )) are frequency domain symbols, and H is a frequency domain channel (or transfer function). Antenna 1: If X(k,t) is the (frequency-domain) symbol to be sent on (or mapped onto) subcarrier k at OFDM symbol time (or symbol time interval) t, then one example implementation of the Alamouti space-time code transmits symbol X(k,2b) from transmit antenna 1 on OFDM symbol time interval 2b and symbol $-X^*(k,2b+1)$ from transmit antenna 1 on OFDM symbol time interval 2b+1, where the * indicates complex conjugate of the symbol. (In this example, note the negation (negative sign), and conjugation of X(k, 2b+1) (with conjugation indicated by *), shown as $-X^*(k, 2b+1)$). Antenna 2: On the same time-frequency resources, transmit antenna 2 sends symbol X(k,2b+1) on OFDM symbol time (OFDM symbol time interval) 2b and symbol $X^*(k,2b)$ on OFDM symbol time interval 2b+1.

Assuming a single receiver antenna, the received signal on OFDM symbol time intervals 2b and 2b+a (e.g., with a=1 in this example) will respectively be $Y(k,2b)=H_1(k)X(k,2b)+H_2(k)X(k,2b+1)$ and $Y(k,2b+1)=-H_1(k)X^*(k,2b+1)+H_2(k)X^*(k,2b)$ where $H_1(k)$ is the frequency-domain channel (or transfer function) for transmit antenna 1 to the receiver antenna on subcarrier k and $H_2(k)$ is the frequency-domain channel for transmit antenna 2 to the receiver antenna on subcarrier k. The receiver could then estimate the symbols as:

$$\hat{X}(k, 2b) = \frac{H_1^*(k)Y(k, 2b) + H_2(k)Y^*(k, 2b+1)}{|H_1(k)|^2 + |H_2(k)|^2} \text{ and} \qquad \text{Eqn. 3}$$

$$\hat{X}(k, 2b+1) = \frac{H_2^*(k)Y(k, 2b) + H_1(k)Y^*(k, 2b+1)}{|H_1(k)|^2 + |H_2(k)|^2}.$$

Equations for estimated symbols in frequency domain for symbol times (or symbol time intervals) $2b$, and $2b+1$ (e.g., estimated by a receiver).

In an example implementation, if unit transmit power is desired, each transmit antenna may decrease its transmit power by half, e.g., in order to provide a unit transmit power (which may also be known as power normalization). However, normalization is not always desirable. For example power normalization may not be desirable for RF-beamforming, because with RF beamforming, the Alamouti space-time code may be employed across two antennas (or antenna arrays) with two different polarizations which cannot share their transmit power. Therefore, in such an arrangement, if one antenna array is switched off, the other array cannot necessarily boost its power by 3 dB (or double its power), since these two antenna arrays have separate RF chains.

In an example implementation, with Alamouti space-time coding in the frequency domain, if the original time-domain block sequence symbols are $[x(0), \ldots, x(N-1)]$, then the time-domain symbols are $[x^*(0), x^*(N-1), \ldots, x^*(1)]$ after conjugation (this is the conjugation done on OFDM symbol time $2b+1$ above). This formula follows from the DFT (Discrete Fourier Transform) properties. Hence, according to an example implementation, if the space-time coding step of conjugation were to be directly applied in the frequency domain to a ZT-SOFDM post-spread signal with $N_P=3$ pre-symbol zeros and $L_{CP}$-$N_P$=10 post-symbol zeros whose pre-spread symbols are $[0\ 0\ 0\ s(0,2b+1) \ldots s(K-L_{CP},2b+1),0\ 0\ 0\ 0\ 0\ 0\ 0\ 0\ 0\ 0]$, the result would be a pre-spread signal of $[0\ 0\ 0\ 0\ 0\ 0\ 0\ 0\ 0\ 0\ 0\ s^*(K-L_{CP},2b+1) \ldots s^*(0,2b+1)\ 0\ 0]$ using the above DFT property. In other words there would be $L_{CP}$-$N_P$+1=11 zeros before the conjugated-time-reversed data symbols and $N_P$-1 zeros after the conjugated-time-reversed data symbols. Hence, with such an approach, the desired zero locations of the zeros would not be $N_P$ zeros before the pre-spread data symbols and $L_{CP}$-$N_P$ zeros after the data symbols thus destroying the desired CP (cyclic prefix) locations of the final (or transmitted) ZT-SOFDM signal. Other example implementations are described below that provide a desired number of zeros before and after the data symbols to preserve the cyclic prefix.

Note that the original Alamouti space-time code that is typically applied on time-domain symbols is somewhat loose or flexible in the order of conjugation and negation. Therefore, based on this flexible order of conjugation and negation for Alamouti space-time coding, the following application of Alamouti space-time coding to the frequency domain is a valid alternate to the Alamouti encoding shown above: If $X(k,t)$ is the frequency domain symbol to be sent on (or mapped to) subcarrier k at OFDM symbol time t, then an alternative to the Alamouti space-time code may send/transmit frequency domain symbol $X(k,2b)$ from transmit antenna 1 on OFDM symbol time $2b$ and frequency domain $X(k,2b+1)$ from transmit antenna 1 on OFDM symbol time $2b+1$. On the same time-frequency resources, transmit antenna 2 may send/transmit frequency domain symbol $X^*(k,2b+1)$ on OFDM symbol time $2b$ and frequency domain symbol $-X^*(k,2b)$ on OFDM symbol time $2b+1$, according to an illustrative example.

According to a illustrative example implementation, a space-time coding of the ZT-SOFDM signal may be performed as follows. As shown by Eqn. 4 (below), on a first OFDM symbol time, $2b$, the transmission from each array (or transmit antenna) is the same as the Alamouti space-time code for frequency-domain modulation methods (Tx1 refers to Antenna 1, and Tx2 refers to Antenna 2):

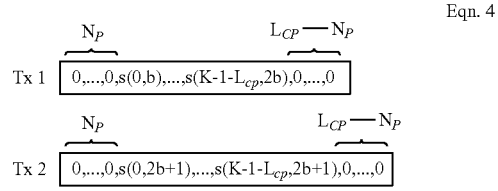

Example space-time coded (pre-spread time domain) singals for Z-SOFDM - for antenna 1 (Tx 1) and antenna 2 (Tx 2) for symbol time $2b$.

Note, that by design the first antenna array (Tx1) is transmitting the symbols for block $2b$ and the second antenna array (Tx2) is transmitting the symbols for block $2b+1$ during OFDM symbol time (or OFDM symbol time interval) $2b$. In an example implementation (and as shown in Eqns. 4 and 5), each block of K symbols (including the symbols for block $2b$ and for block $2b+1$) includes a group of $K$-$L_{CP}$ data symbols and $L_{CP}$ appended zeros (including $N_P$ prepended zeros and $L_{CP}$-$N_P$ postpended zeros to the group of $K$-$L_{CP}$ data symbols).

At the second OFDM symbol time, $2b+1$, the transmission is different from the standard Alamouti encoding for frequency-domain modulation methods in order to maintain the location of the zero symbols, e.g., at the receiver. The transmissions from antenna array 1 (Tx 1) and antenna array 2 (Tx 2) for symbol time $2b+1$ are shown by Eqn. 5.

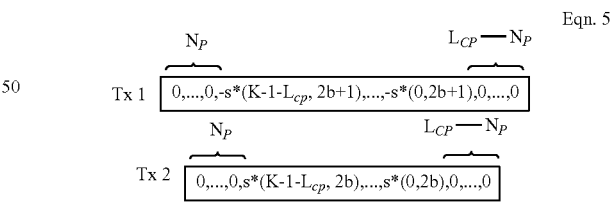

Example space-time coded (pre-spread time domain) signals for ZT-SOFDM - for antenna 1 (Tx-1) and antenna (Tx-2) for symbol time (for symbol time interval) $2b+1$.

As shown by Eqn. 5, for symbol time interval $2b+1$, antennas 1 and 2 swap blocks as compared to transmission during symbol time $2b$, and some processing (e.g., conjugation, negation, and/or reversing order) of the data symbols is performed for each block, in this example, for symbol time $2b+1$. By swapping blocks, for example: for symbol time $2b$, antenna array 1 (Tx 1) transmits block $2b$ and antenna array 2 (Tx 2) transmits block $2b+1$; while, for symbol time 2b+1, antenna array 1 (Tx 1) transmits block 2b+1 (or a processed version thereof), while antenna array 2 (Tx 2) transmits block 2b (or a processed version thereof).

According to an example implementation, as shown by Eqn. 5, for symbol time (or symbol time interval) 2b+1, antenna array 1 (Tx 1) transmits the symbols for block 2b+1 after performing time-reversal, conjugation and negation of only the data symbols (the group of K-$L_{CP}$ data symbols in this example) of block 2b+1, while antenna array 2 (Tx 2) transmits the symbols for block 2b after performing time reversal and conjugation of only the data symbols of the block 2b. Note, for both blocks, the time reversal and conjugation is performed only for data symbols within each block, and is not performed on the $N_P$ pre-pended and $L_{CP}$-$N_P$ post-pended zeros. Note that again by design, the antenna array 2 (Tx 2) is transmitting the data symbols for block 2b+1 on (or during) OFDM symbol 2b and the data symbols for block 2b on (or during) OFDM symbol 2b+1. Similarly, antenna array 1 (Tx 1) is transmitting the data symbols for block 2b on (or during) OFDM symbol 2b and the data symbols for block 2b+1 on (or during) OFDM symbol 2b+1. As noted, some processing (e.g., conjugation, time reversal, and/or negation) may be performed for one or more of the symbol blocks.

Negation may include applying a negative operator to a data symbol (or taking the negative of the symbol), as shown by the minus sign in Eqn. 5. Conjugation may refer to performing a complex conjugate operation on each data symbol in the block, or taking the complex conjugate of each data symbol. Time reversal may include reversing the time order of the group of K-$L_{CP}$ data symbols within the block (note that this time reversal is performed only on the group of data symbols and does not affect the number of prepended and postpended zeros within each block).

As an example of time reversal, as shown in Eqns. 4 and 5, the original order of symbol block 2b is: s(0,2b), . . . , s(K−1-$L_{CP}$,2b), and is transmitted by antenna array 1 (Tx 1) during symbol time 2b (see Eqn. 4). Whereas, antenna array 2 (Tx 2) transmits symbol block 2b (where the data symbols have been conjugated and time reversed) during symbol time 2b+1. Thus, the order of data symbols for block 2b is reversed for symbol time 2b+1, being now in the order of: s(K−1-$L_{CP}$,2b), . . . s(0,2b), . . . . Thus, for example, in the time reversed order at symbol time 2b+1, the original last data symbol s(K−1-$L_{CP}$,2b) is now first within the group of data symbols, and the original first data symbol s(0,2b) is now last within the group of time-domain data symbols.

In each case the K symbols of the ZT-SOFDM symbol blocks of Eqns. 4 and 5 are spread by the K-point FFT (Fast Fourier Transform) before mapping to the occupied OFDM subcarriers and then brought back to the time-domain with an N-point IFFT (Inverse Fast Fourier Transform) to create the transmitted OFDM symbols on each transmit antenna array (or antenna).

Figure 7:
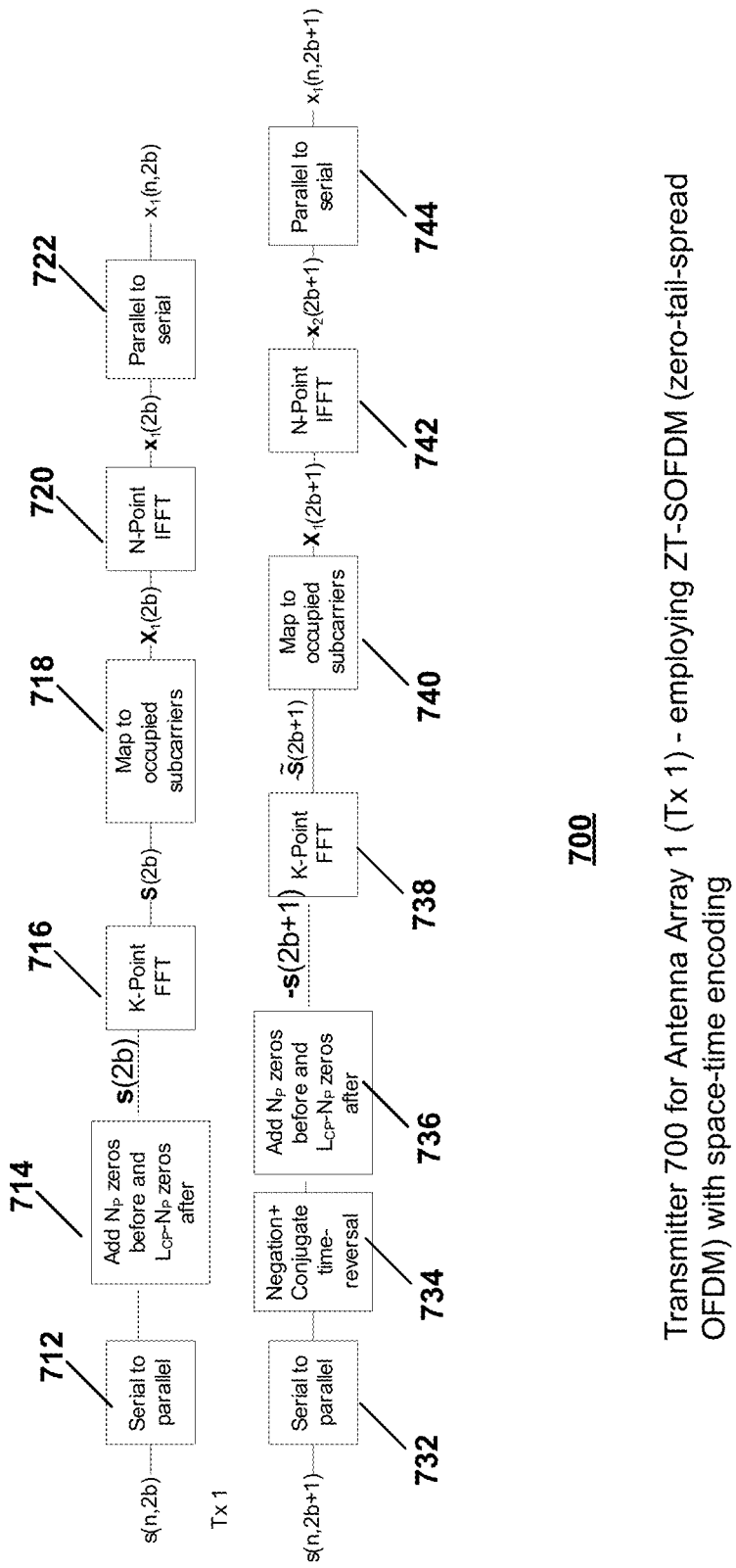
FIG. 7 is a block diagram illustrating a transmitter for antenna array that employs ZT-SOFDM with space-time encoding according to an example implementation.
Figure 8:
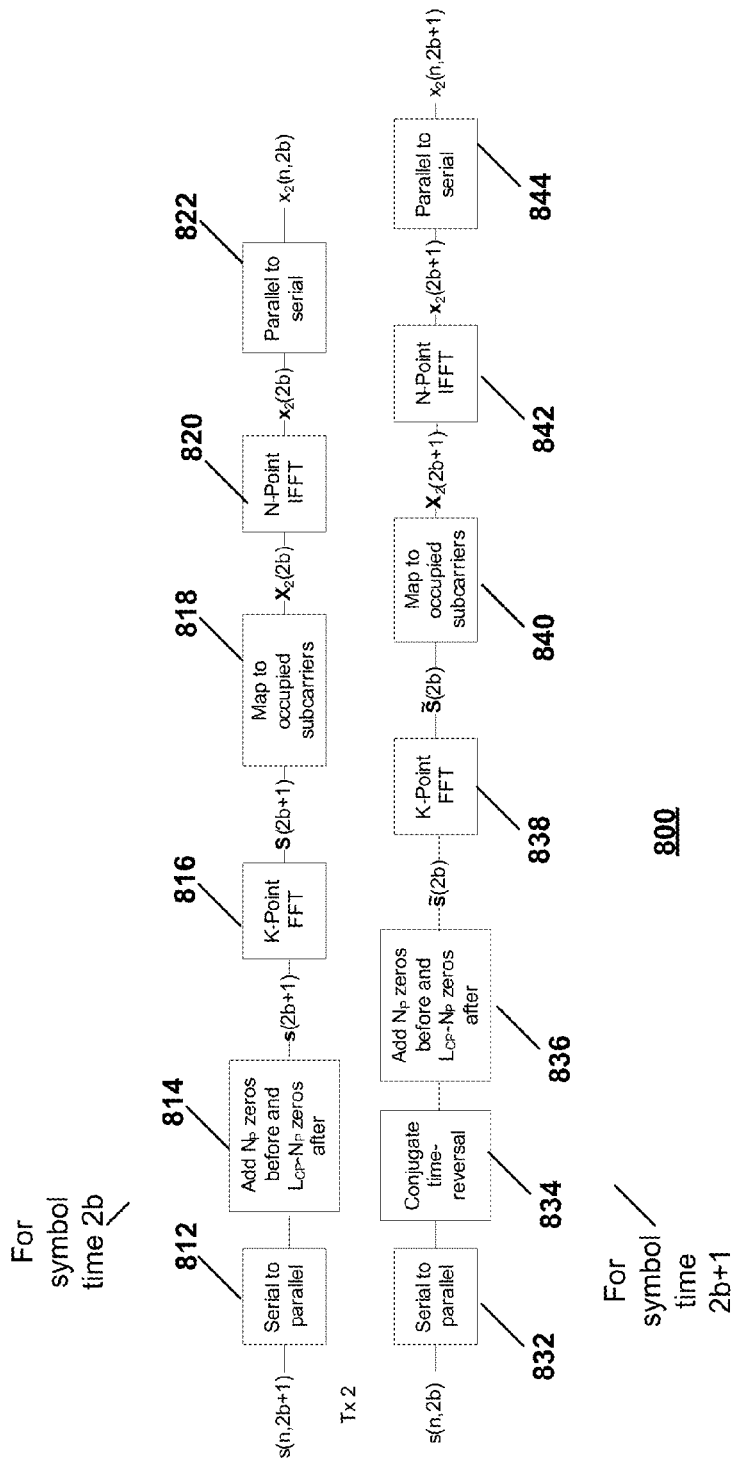
FIG. 8 is a block diagram illustrating a transmitter for an antenna array that employs ZT-SOFDM with space-time encoding according to an example implementation.

FIG. 7 is a block diagram illustrating a transmitter for antenna array 1 (Tx 1) 700 that employs ZT-SOFDM with space-time encoding. FIG. 8 is a block diagram illustrating a transmitter for antenna array 2 (Tx 2) 800 that employs ZT-SOFDM with space-time encoding. According to an example implementation, a base station, AP, eNB or other wireless device may use transmitters 700 and 800 as part of a ZT-SOFDM transmitter with (e.g., Alamouti or Alamouti-type) space-time encoding.

Referring to FIG. 7, for symbol time 2b, transmitter 700 for antenna array 1 (Tx 1) receives a group of data symbols s(n, 2b). A serial-to-parallel block 712 converts the serial symbol stream into a parallel group of K-$L_{CP}$ data symbols. Zero appending block 714 adds or appends $N_P$ zeros before (prepends) and $L_{CP}$-$N_P$ zeros after (postpends) the group of data symbols, to create the block of pre-spread domain symbols (including data symbols and zero symbols). FFT block 716 then converts the block of pre-spread domain symbols to the frequency domain by performing a K-point FFT on the received block of time domain symbols, and outputs a block of frequency domain symbols S(2b). Subcarrier mapping block 718 then maps each symbol of the block of frequency domain symbols to occupied subcarriers to create $X_1$(2b). An IFFT block 722 converts the block of frequency domain symbols to the time domain by performing an IFFT on the block of frequency domain symbols $X_1$(2b), to thereby create a block of time domain symbols $x_1$(2b). Parallel-to-serial block 722 converts the parallel block of time domain symbols $x_1$(2b) into a serial stream of time domain symbols $x_1$(n, 2b), for transmission over antenna array 1 (Tx 1).

Referring to FIG. 7, for symbol time 2b+1, transmitter 700 for antenna array 1 (Tx 1) receives a group of data symbols s(n, 2b+1). A serial-to-parallel block 732 converts the serial symbol stream into a parallel group of K-$L_{CP}$ data symbols. Symbol processing block 734 performs a negation, conjugation and time reversal on the received group of data symbols. Zero appending block 736 adds or appends $N_P$ zeros before (prepends) and $L_{CP}$-$N_P$ zeros after (postpends) the (negated, conjugated and time reversed) group of data symbols output from symbol processing block 734, to output a block of pre-spread domain symbols −s̃(2b+1), where the tilde indicates conjugation and time reversal having been performed on the block. FFT block 738 then converts the block of pre-spread domain symbols output from block 734 to the frequency domain by performing a K-point FFT on the received block of time domain symbols, and outputs a block of frequency domain symbols −S̃(2b+1). Subcarrier mapping block 740 then maps each symbol of the block of frequency domain symbols to occupied subcarriers to create $X_1$(2b+1). An IFFT block 742 converts the block of frequency domain symbols to the time domain by performing an N point IFFT on the block of frequency domain symbols $X_1$(2b+1), to thereby create a block of time domain symbols $x_1$(2b+1). Parallel-to-serial block 744 converts the parallel block of time domain symbols $x_1$(2b+1) into a serial stream of time domain symbols $x_1$(n, 2b+1), for transmission over antenna array 1 (Tx 1).

Referring to FIG. 8, for symbol time 2b, transmitter 800 for antenna array 2 (Tx 2) receives a group of data symbols s(n, 2b+1), which are the time domain symbols for block 2b+1. A serial-to-parallel block 812 converts the serial symbol stream into a parallel group of K-$L_{CP}$ data symbols. Zero appending block 814 adds or appends $N_P$ zeros before (prepends) and $L_{CP}$-$N_P$ zeros after (postpends) the group of data symbols, to create the block of pre-spread domain symbols (including data symbols and zero symbols). FFT block 816 then converts the block of pre-spread domain symbols to the frequency domain by performing a K-point FFT on the received block of time domain symbols, and outputs a block of frequency domain symbols S(2b+1), where 2b+1 here indicates data from block 2b+1. Subcarrier mapping block 818 then maps each symbol of the block of frequency domain symbols to occupied subcarriers to create $X_2$(2b), where 2b here indicates that these carriers provide symbol data for symbol time 2b. An IFFT block 820 converts the block of frequency domain symbols to the time domain by performing an IFFT on the block of frequency domain symbols $X_2$(2b), to thereby create a block of time domain symbols $x_2$(2b). Parallel-to-serial block 822 converts the parallel block of time domain symbols $x_2(2b)$ into a serial stream of time domain symbols $x_2(n, 2b)$, for transmission over antenna array 2 (Tx 2), where $x_2$ indicates that this is time domain data (lower case x) for antenna 2, and 2b indicates that this is data for symbol time 2b.

Also referring to FIG. 8, for symbol time 2b+1, transmitter 800 for antenna array 2 (Tx 2) receives a group of data symbols s(n, 2b), which is the symbol block 2b. A serial-to-parallel block 832 converts the serial symbol stream into a parallel group of K-$L_{CP}$ data symbols. Symbol processing block 834 performs a conjugation and time reversal on the received group of data symbols to output a block of pre-spread domain symbols $\tilde{s}(2b)$, where the tilde indicates that conjugation and time reversal having been performed on the block. Zero appending block 836 adds or appends $N_P$ zeros before (prepends) and $L_{CP}$-$N_P$ zeros after (postpends) the (conjugated and time reversed) group of data symbols output from symbol processing block 834. FFT block 838 then converts the block of pre-spread domain symbols output from block 836 to the frequency domain by performing a K-point FFT on the received block of time domain symbols, and outputs a block of frequency domain symbols $\tilde{S}(2b)$, where the upper case S indicates frequency domain symbols, and 2b indicates data for symbol block 2b. Subcarrier mapping block 840 then maps each symbol of the block of frequency domain symbols to occupied subcarriers to create $X_2(2b+1)$, where $X_2$ indicates frequency domain symbols (based on upper case X) for antenna 2 (indicates by subscript 2), and 2b+1 indicates data for symbol time (or symbol time interval) 2b+1. An IFFT block 842 converts the block of frequency domain symbols to the time domain by performing an N point IFFT on the block of frequency domain symbols $X_2(2b+1)$, to thereby create a block of time domain symbols $x_2(2b+1)$. Parallel-to-serial block 844 converts the parallel block of time domain symbols $x_2(2b+1)$ into a serial stream of time domain symbols $x_2(n, 2b+1)$, for transmission over antenna array 2 (Tx 2) where $x_2$ indicates that this is time domain data (lower case x) for antenna 2 (based on subscript 2), and 2b+1 indicates that this is data for symbol time interval 2b+1.

Therefore, to summarize, Eqns. 4 and 5 identify space-time encoded (pre-spread domain) signals for ZT-SOFDM—for antenna 1 (Tx 1) and antenna a (Tx 2) for symbol times 2b (Eqns. 4) and 2b+1 (Eqn. 5). In each case, the K symbols of the ZT-SOFDM symbols blocks of Eqns. 4 and 5 are then spread by a K-point FFT before mapping to occupied OFDM subcarriers and then brought back to the time domain with an N-point IFFT to create the transmitted time-domain OFDM symbols on each transmit antenna array.

There are various example implementations or example techniques that may be used perform space-time coding. There are many variants of how the symbols can be transmitted for space-time coding, but according to an example implementation, a first antenna (array) transmits the symbol group without the time reversal and conjugation via a first resource (e.g., either a first time resource such as first OFDM symbol time, or a frequency resource such as a first subcarrier) and a second antenna (array) transmits the same symbol group with the time reversal and conjugation via a second resource (e.g., (e.g., either via a second time resource such as second OFDM symbol time, or via a frequency resource such as a second subcarrier). The same or similar operations may also be performed on a second group of data symbols. The same or similar approach may be used by a receiver. While some of the various examples are illustrated with respect to two time intervals (e.g., first and second OFDM symbol times), the various example implementations may be applied to first and second frequency resource, such as first and second subcarriers.

Thus, in an example implementation, a first antenna (array) may transmit a symbol group without the time reversal and conjugation during a first OFDM symbol time, and a second antenna (array) transmits the same symbol group with the time reversal and conjugation during a second OFDM symbol time. Note that according to an example implementation, appending $L_{CP}$ zeros (including $N_P$ pre-pended and $L_{CP}$-$N_P$ post-pended zeros) to the group of pre-spread domain data symbols) provides at least two advantages: First, this approach uses the Alamouti space-time encoding, and therefore, allows the transmitter and receiver to obtain the advantages of space-time encoding (e.g., Alamouti space-time coding), including achieving full transmit diversity gains. In addition the use of ZT-SOFDM in conjunction with the space-time coding allows the transmitter and receiver to obtain the advantages of ZT-SOFDM including improved spectral properties of the transmitted signals including low out-of-band emissions. Second, by including $N_P$ pre-pended and $L_{CP}$-$N_P$ post-pended zeros to the group of pre-spread domain data symbols in the pre-spread symbol block, this results in $N_P'$ near-zero symbols before and $L_{CP}'$-$N_P'$ near-zero symbols after the N-$L_{CP}'$ regular power time domain (data) symbols, resulting in the transmitted time domain block of data including a cyclic prefix of length $L_{CP}'$. Thus, appending zeros to the pre-spread block of symbols allows Alamouti space-time encoding to be used (and to obtain the advantages thereof), while providing an appropriate cyclic prefix (of near-zero symbols) for the transmitted block without using an extra step of adding zeros to the time domain block of data just before transmission. Thus, there is no need to add zeros (e.g., after the IFFT operation at the transmitter) just before transmission in order to provide a cyclic prefix because a cyclic prefix in the transmitted signal results from the appending of zeros to the pre-spread signal (prior to operations of spreading via FFT, mapping to occupied subcarriers, and IFFT). As described in greater detail below, the receiver may provide a phase shift for the received block of data to account for the fact that only the group of data symbols within the block of time domain symbols are time-reversed, rather than the entire block.

Further details are now provided. With reference to FIGS. 7 and 8, the K×1 vector of frequency-domain symbols after K-point DFT spreading the ZT-SOFDM symbol blocks, s(2b) and s(2b+1), are given by S(2b)=[S(0,2b), . . . , S(K−1,2b)]$^T$ and S(2b+1)=[S(0,2b+1), . . . , S(K−1,2b+1)]$^T$ respectively. Note that both s(2b) and s(2b+1) are also K×1 vectors respectively containing the following symbols, described by Eqn. 6:

$$\underbrace{0,\ldots,0}_{N_P},s(0,2b),\ldots,s(K-1-L_{cp},2b),\underbrace{0,\ldots,0}_{L_{CP}-N_P} \text{ and}$$

$$\underbrace{0,\ldots,0}_{N_P},s(0,2b+1),\ldots,s(K-1-L_{cp},2b+1),\underbrace{0,\ldots,0}_{L_{CP}-N_P}$$

Eqn. 6 symbol blocks s(2b) and s(2b+1)

Then S(2b) and S(2b+1) are respectively the K-point DFT of those two blocks of symbols. In other words, S(k,t) (where t=2b or t=2b+1) is given by the K-point DFT of s(n,t), shown by Eqn. 7:

$$S(k, t) = \frac{1}{\sqrt{K - L_{CP}}} \sum_{n=0}^{K-1-L_{CP}} s(n, t)e^{-j2\pi(n+N_p)k/K} \quad \text{Eqn. 7}$$

Equation for $S(k, t)$

The K×1 vector of frequency-domain symbols after K-point DFT spreading the ZT-SOFDM symbol blocks which are time-reversed and conjugated, $\tilde{s}(2b)$ and $\tilde{s}(2b+1)$, are given by $\tilde{S}(2b)=[\tilde{S}(0,2b), \ldots, \tilde{S}(K-1,2b)]^T$ and $\tilde{S}(2b+1)=[\tilde{S}(0,2b+1), \ldots, \tilde{S}(K-1,2b+1)]^T$ respectively. Note that both $\tilde{s}(2b)$ and $\tilde{s}(2b+1)$ are also K×1 vectors respectively containing the following symbols, shown by Eqn. 8:

Eqn. 8

$$\overbrace{0,\ldots,0}^{N_P},s^*(K-1-L_{cp},2b),\ldots,s^*(0,2b),\overbrace{0,\ldots,0}^{L_{CP}-N_P} \quad \text{and}$$

$$\overbrace{0,\ldots,0}^{N_P},s^*(K-1-L_{cp},2b+1),\ldots,s^*(0,2b+1),\overbrace{0,\ldots,0}^{L_{CP}-N_P}$$

$\tilde{s}(2b)$ and $\tilde{s}(2b+1)$

Then $\tilde{S}(2b)$ and $\tilde{S}(2b+1)$ are respectively the K-point DFT of those two blocks of symbols. In other words, $\tilde{S}(k,t)$ (where t=2b or t=2b+1) is given by the K-point DFT of the elements of $\tilde{s}(t)$ which are the time-reversed and conjugated s(n,t), shown by Eqn. 9:

$$\tilde{S}(k, t) = \frac{1}{\sqrt{K - L_{CP}}} \sum_{n=0}^{K-1-L_{CP}} s^*(K-1-L_{CP}-n, t)e^{-j2\pi(n+N_p)k/K} \quad \text{Eqn. 9}$$

$\tilde{S}(k, t)$

Note that by having the zeros in the pre-spread data, the final time-domain signal after the N-point IFFT would have $N_P'$ near-zero symbols before the N-$L_{CP}'$ regular-power time-domain symbols and $L_{CP}'-N_P'$ near-zero symbols after the N-$L_{CP}'$ regular-power time-domain data symbols where $N_P'=N*N_P/K$ and $L_{CP}'=N*L_{CP}/K$. The placement of zeros is the same as for normal ZT-SOFDM operation, thereby providing an appropriate cyclic prefix. By near-zero symbols, this may include symbols which are essentially low enough in amplitude that they can be considered zero (e.g., in one example implementation near zero symbols may be approximately 20 dB lower than the N-$L_{CP}'$ regular-power time-domain data symbols). In this way the near-zero symbols act or operate the same as (or very similar to) a null cyclic prefix even though they are not completely zero. One example goal of the space-time encoding above with the time-reversal and the zero insertion is to create near-zero symbols in the time-domain transmitted waveform that are in the desired locations as mentioned above (i.e., $N_P'$ near-zero symbols before the N-$L_{CP}'$ regular power time-domain symbols and $L_{CP}'-N_P'$ near-zero symbols after the N-$L_{CP}'$ regular power time-domain data symbols), e.g., to provide an appropriate or desired cyclic prefix. For example, $L_{CP}'$ may be chosen to span the expected length of typical channels so as to ensure good frequency-domain equalization.

At the receiver the fact that the time-reversal for a block(s) is performed only for the data symbols, e.g., as shown by Eqn. 5, and does not include the time-reversal of the entire block of K symbols (including data and appended zeros) as would typically be required by the Alamouti coding, the equalizer at the receiver may compensate, e.g., to allow Alamouti decoding to be used. In other words, in some cases, an Alamouti decoding at the receiver (at least for some receivers) may assume that $\tilde{S}(k,b)=S^*(k,b)$ which is not the case with space-time coding in ZT-SOFDM shown above in Eqns. 4-5, and shown by transmitter in FIGS. 7-8 because the zero-placement in the pre-spread symbols needs to be the same place in both the non-time-shifted/non-conjugated symbols as well as the time-shifted and conjugated symbols, e.g., to provide the cyclic prefix in the desired location in the transmitted time-domain signal. In fact for t=2b or t=2b+1, the following Eqn. 10 describes $\tilde{S}(k,t)$:

$\tilde{S}(k,t)=S^*(k,t)e^{j2\pi k(2N_P-1-L_{CP})/K}$ and it will be the phase shift term in this equation which should be compensated for at the receiver for those blocks that were conjugated and time reversed at the transmitter, e.g., to use Alamouti space-time encoding and decoding.

Figure 9:
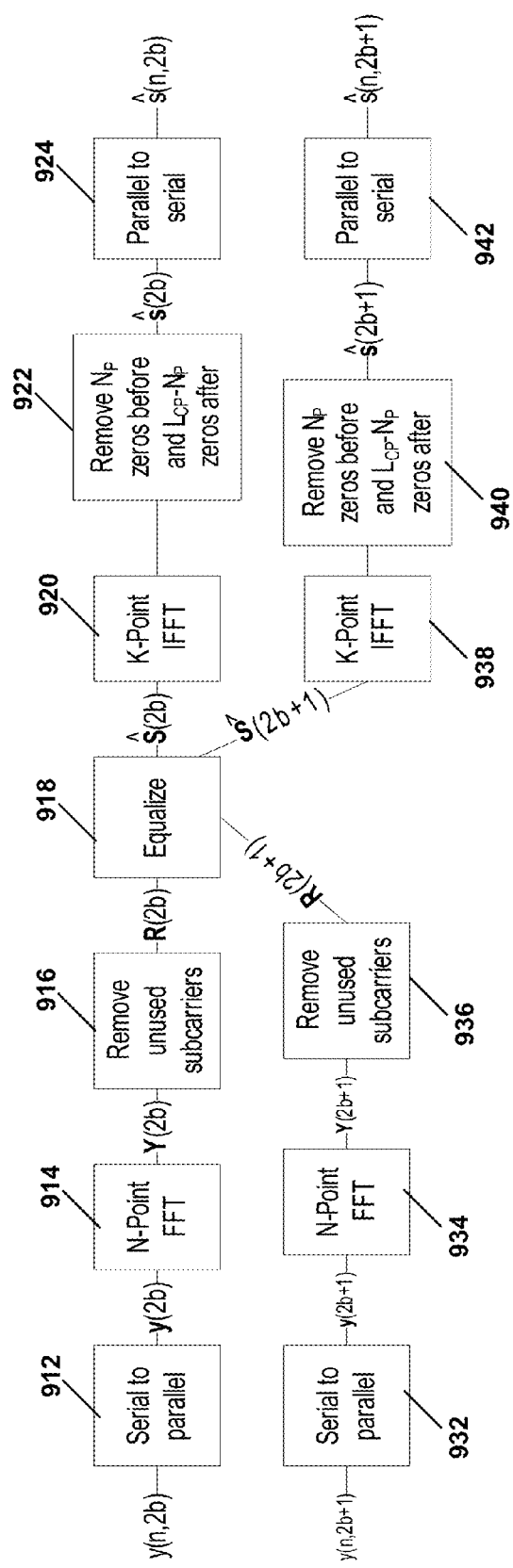
FIG. 9 is a block diagram of a ZT-SOFDM space-time coding receiver according to an example implementation.

FIG. 9 is a block diagram of a ZT-SOFDM space-time coding receiver according to an example implementation. Referring to FIG. 9, symbol block y(n, 2b) for symbol time interval 2b is received. Serial-to-parallel block 912 converts the serial symbols to parallel, and FFT block 914 performs a N-point FFT on the parallel data. Subcarrier removal block 916 removes unused subcarriers, and outputs a pre-equalizer signal vector R(2b). Similarly, a symbol block y(n, 2b+1) is received for symbol time interval 2b+1, and serial-to-parallel block 932, FFT block and subcarrier removal block 936 perform the same functions on the symbol block y(n, 2b+1) and outputs a pre-equalizer R(2b+1).

The pre-equalizer signal vectors, R(2b) and R(2b+1) are given by Eqn. 11 as follows:

$$R(2b) = \begin{bmatrix} R(0, 2b) \\ \vdots \\ R(K-1, 2b) \end{bmatrix} \text{ and } R(2b+1) = \begin{bmatrix} R(0, 2b+1) \\ \vdots \\ R(K-1, 2b+1) \end{bmatrix} \quad \text{Eqn. 11}$$

Pre-equalizer signal vectors, $R(2b)$ and $R(2b+1)$.

It can be shown that R(k,2b) and R(k,2b+1) are given by Eqn. 12 for a single-receive antenna receiver, as follows:

$$R(k, 2b) = H_1(k)S(k, 2b) + H_2(k)S(k, 2b+1) \text{ and} \quad \text{Eqn. 12}$$
$$R(k, 2b+1) = -H_1(k)\tilde{S}(k, 2b+1) + H_2(k)\tilde{S}(k, 2b),$$

$R(k, 2b)$ and $R(k, 2b+1)$

With respect to Eqn. 12, where S(k,t) is the $k^{th}$ element of S(t) from FIGS. 7 and 8 (i.e., S(k,t) is the spread symbol on subcarrier k for symbol block t), S is the $k^{th}$ element of $\tilde{S}(t)$ from the same figures (i.e., $\tilde{S}(k,t)$ is the spread conjugated-time-revered symbol on subcarrier k for symbol block t), $H_1(k)$ is the frequency-domain channel from transmit array 1 to the receiver and $H_2(k)$ is the frequency-domain channel from transmit array 2 to the receiver.

As mentioned, the receiver needs to account for (or compensate for) the fact that the transmitter (FIGS. 7 and 8) performed the following conjugation and time reversal of only the data symbols, as follows (for symbol time 2b+1):

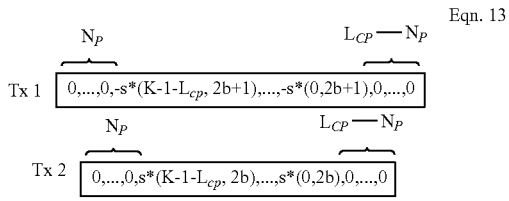

transmitted space-time coded (pre-spread time domain) signals for ZT-SOFDM - for antenna 1 (Tx-1) and antenna (Tx-2) for symbol time (for symbol time interval) 2b+1, per FIGS. 7 and 8. (Eqn. 13 is same as Eqn. 5 above).

On the other hand, a standard Alamouti receiver would be expecting (for $N_P>0$) the following (shown by Eqn. 14) since it would assume the conjugation is done in the frequency-domain after the spreading operation:

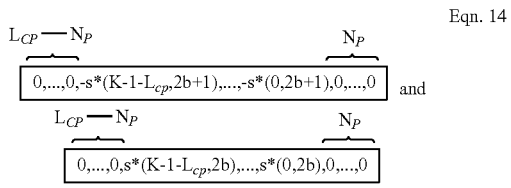

Expected space-time coded signals for ZT-SOFDM - for antenna 1 (Tx 1) and antenna a (Tx-2) for symbol time (or symbol time interval) 2b+1, for standard Alamouti coding is used, where conjugation is done in the frequency domain after spreading operation.

Hence at OFDM symbol time 2b+1, the ZT-SOFDM space-time-coding equalizer 918 must include a linear phase shift in the frequency-domain which effectively shifts the pre-spread domain symbols by $L_{CP}-2N_P+1$ to make the actual received signal (Eqn. 13) look like the signal in Eqn. 14. This step of including the phase shift makes the receiver different from the usual space-time coded frequency-domain receiver. The estimate of the spread symbols on blocks 2b and 2b+1 are given by Eqn. 15 as follows (the exponential term in Eqn. 15 applies a phase shift to symbols in the block):

$$\hat{S}(k, 2b) = \qquad \text{Eqn. 14}$$
$$\frac{H_1^*(k)R(k, 2b) + e^{j2\pi k(2N_P-1-L_{CP})/K}H_2(k)R^*(k, 2b+1)}{|H_1(k)|^2 + |H_2(k)|^2}$$

$$\hat{S}(k, 2b+1) =$$
$$\frac{H_2^*(k)R(k, 2b) - e^{j2\pi k(2N_P-1-L_{CP})/K}H_1(k)R^*(k, 2b+1)}{|H_1(k)|^2 + |H_2(k)|^2}$$

estimate of the spread symbols on blocks $2b$ and $2b + 1$

After the equalizer estimates the spread symbols in the frequency domain, then a K-point IFFT is performed on the symbol estimates by IFFT blocks 920 (for block for symbol time 2b) and 938 (for block for symbol time 2b+1). Symbol processing blocks 922 and 940 then remove the appended zeros (e.g., to remove the $N_P$ zeros before and $L_{CP}$-$N_P$ zeros after the data symbols) to obtain the data symbol estimates as shown in FIG. 9.

As noted, by way of example, the various implementations are applicable to space-time codes with two antennas, as well as for more than two antenna arrays for pair-wise Alamouti encoding such as performed in the downlink of LTE for four transmit antennas. An example of this case is where there are two arrays per sector, and each array may be a hybrid array.

Another example option (or example implementation) for pair-wise Alamouti transmission is to break the K-$L_{CP}$ data symbols in a block into two sub-blocks each of length (K-$L_{CP}$)/2. Then the space-time coding is done similar to the full blocks except that $N_P$/2 zeros are inserted before the block of (K-$L_{CP}$)/2 symbols and ($L_{CP}$-$N_P$)/2 zeros are inserted after the block of (K-$L_{CP}$)/2 symbols. Then a K/2 FFT is applied to the K/2 symbols and they are mapped to half of the occupied subcarriers (e.g., the subcarriers above or below the DC subcarrier). In other words, one pair of antenna beams may have its space-time coded symbols (one of the two sub-blocks) mapped to subcarriers above DC and the other pair of antenna beams has its space-time coded symbols (the other sub-block) mapped to subcarriers below DC. With this mapping, the null cyclic prefix property of the time-domain transmitted signal is preserved. One advantage of this example approach is that the space-time coding can all be done within one OFDM symbol by using the two frequency halves (e.g., above or below DC) in place of the two OFDM symbol times as described above.

Thus, various example implementations may include one or more of the following, such as (by way of example): The time-reversal step on the K-$L_{CP}$ data symbols before pre-pending and post-pending the zeros on the group of ZT-SOFDM symbols before DFT spreading; Conjugation in addition to the time-reversal. Negation in addition to either or both of the time-reversal the conjugation; Using two RF arrays (each with orthogonal polarizations) to transmit the space-time coded signals; Using omni-directional beams for the beams used by the two RF arrays; The receiver equalizer that needs to account (or compensate) for the time-shift created at the transmitter on the conjugated and time-reversed data symbols; Pair-wise space-time coding transmission across frequency (e.g., transmitting symbol blocks 2b, 2b+1 during both symbol times 2b and 2b+1, via two antenna arrays).

Figure 10:
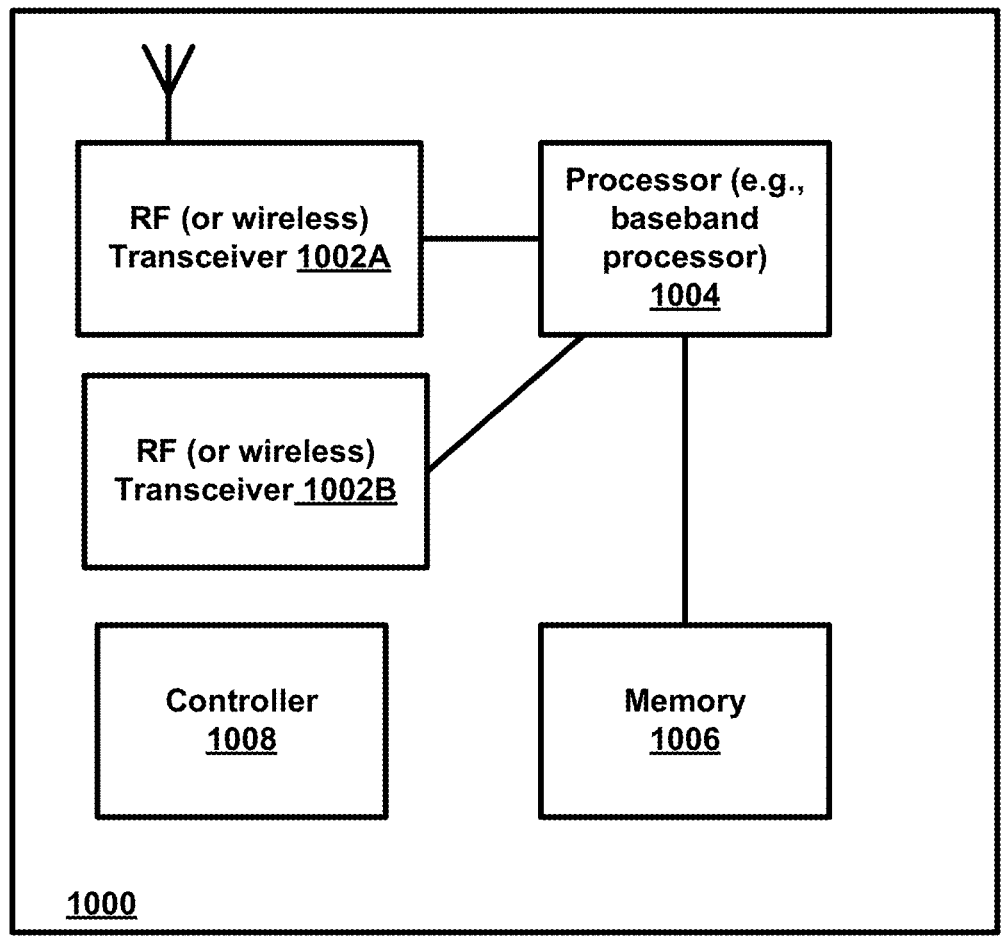
FIG. 10 is a block diagram of a wireless station (e.g., BS or user device) according to an example implementation.

FIG. 10 is a block diagram of a wireless station (e.g., BS or user device) 1000 according to an example implementation. The wireless station 1000 may include, for example, two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above.

Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of transmitting two groups of data symbols, the method comprising:
    generating a first group of data symbols;
    conjugating and time-reversing the first group of data symbols to generate a reversed-conjugated first group of data symbols;
    appending a first quantity of zeros before and a second quantity of zeros after the reversed-conjugated first group of data symbols to generate a first block of pre-spread symbols;
    appending the first quantity of zeros before and the second quantity of zeros after the first group of data symbols to generate a second block of pre-spread symbols;
    spreading the pre-spread symbols for each of the first and second blocks of pre-spread symbols to create a first block of spread symbols and a second block of spread symbols, respectively;
    mapping, for each of the first and second blocks of spread symbols, each of the spread symbols to an occupied subcarrier;
    performing modulation on the first and second blocks of spread data symbols mapped to subcarriers to create a first block of time domain symbols and a second block of time domain symbols, respectively; and
    transmitting the first block of time domain symbols via a first resource and transmitting the second block of time domain symbols via a second resource where the second resource is different from the first resource;
    wherein the zeros appended before and after the reversed-conjugated first group of data symbols creates, in the first block of time domain symbols, a first number of near-zero symbols before and a second number of near-zero symbols after a plurality of non-zero time domain data symbols.

2. The method of claim 1 wherein the transmitting comprises transmitting the first block of time domain symbols via a first antenna array via a first resource and transmitting the second block of time domain symbols via a second antenna array via a second resource where the second resource is different from the first resource, and where the second antenna array is different from the first antenna array.

3. The method of claim 1 wherein the performing modulation comprises performing OFDM (orthogonal frequency division multiplex) modulation on the first and second blocks of spread data symbols mapped to subcarriers to create a first block of time domain symbols and a second block of time domain symbols, respectively.

4. The method of claim 1 wherein the performing modulation comprises performing an inverse Fast Fourier Transform (IFFT) on the first and second blocks of spread data symbols mapped to subcarriers to create a first block of time domain symbols and a second block of time domain symbols, respectively.

5. The method of claim 1 wherein the first resource comprises a first OFDM symbol time, and the second resource comprises a second OFDM symbol time.

6. The method of claim 1 wherein the first resource comprises a first frequency resource or a first subcarrier, and the second resource comprises a second frequency resource or a second subcarrier.

7. The method of claim 1 wherein the conjugating, time-reversing comprises conjugating, time-reversing and negating at least the first group of data symbols to generate a reversed-conjugated first group of data symbols.

8. The method of claim 1 wherein the spreading comprises spreading the pre-spread symbols for each of the first and second blocks of pre-spread symbols via a Discrete Fourier Transform or Fast Fourier Transform to create a first block of spread symbols and a second block of spread symbols, respectively.

9. The method of claim 1 wherein pair-wise space-time coding transmission across frequency is employed in which two groups of data symbols are transmitted via the first resource and via the second resource.

10. A method comprising:
    generating a first group of data symbols and a second group of data symbols;
    conjugating and time-reversing the first group of data symbols to generate a reversed-conjugated first group of data symbols;
    appending a first quantity of zeros before and a second quantity of zeros after the reversed-conjugated first group of data symbols to generate a first block of pre-spread symbols;
    appending the first quantity of zeros before and the second quantity of zeros after the second group of data symbols to generate a second block of pre-spread symbols;
    spreading the pre-spread symbols for each of the first and second blocks of pre-spread symbols to create a first block of spread symbols and a second block of spread symbols, respectively;

mapping, for each of the first and second blocks of spread symbols, each of the spread symbols to an occupied subcarrier;

performing an inverse Fast Fourier Transform on the first and second blocks of spread data symbols mapped to subcarriers to create a first block of time domain symbols and a second block of time domain symbols, respectively; and transmitting the first block of time domain symbols via a first antenna array during a first OFDM (orthogonal frequency division multiplexing) symbol time and transmitting the second block of time domain symbols via the first antenna array during a second OFDM symbol time where the second OFDM symbol time is different from the first OFDM symbol time;

wherein the zeros appended before and after the reversed-conjugated first group of data symbols creates, in the first block of time domain symbols, a first number of near-zero symbols before and a second number of near-zero symbols after a plurality of non-zero time domain data symbols.

11. The method of claim 10 and further comprising:

conjugating and time-reversing the second group of data symbols to generate a reversed-conjugated second group of data symbols; and wherein the appending the first quantity of zeros before and the second quantity of zeros after the second group of data symbols comprises appending the first quantity of zeros before and the second quantity of zeros after the reversed-conjugated second group of data symbols to generate a second block of pre-spread symbols.

12. An apparatus comprising at least one processor and at least one memory including computer instructions, when executed by the at least one processor, cause the apparatus to:

generate a first group of data symbols;

conjugate and time-reversing the first group of data symbols to generate a reversed-conjugated first group of data symbols;

append a first quantity of zeros before and a second quantity of zeros after the reversed-conjugated first group of data symbols to generate a first block of pre-spread symbols;

append the first quantity of zeros before and the second quantity of zeros after the first group of data symbols to generate a second block of pre-spread symbols;

spread the pre-spread symbols for each of the first and second blocks of pre-spread symbols to create a first block of spread symbols and a second block of spread symbols, respectively;

map, for each of the first and second blocks of spread symbols, each of the spread symbols to an occupied subcarrier;

perform modulation on the first and second blocks of spread data symbols mapped to subcarriers to create a first block of time domain symbols and a second block of time domain symbols, respectively; and transmit the first block of time domain symbols via a first resource and transmitting the second block of time domain symbols via a second resource where the second resource is different from the first resource;

wherein the zeros appended before and after the reversed-conjugated first group of data symbols creates, in the first block of time domain symbols, a first number of near-zero symbols before and a second number of near-zero symbols after a plurality of non-zero time domain data symbols.

13. The apparatus of claim 12, wherein instructions causing the apparatus to perform modulation comprises causing the apparatus to perform an inverse Fast Fourier Transform (IFFT) on the first and second blocks of spread data symbols mapped to subcarriers to create a first block of time domain symbols and a second block of time domain symbols, respectively.

14. The apparatus of claim 12, wherein the first resource comprises a first OFDM symbol time, and the second resource comprises a second OFDM symbol time.

15. The apparatus of claim 12, wherein the first resource comprises a first frequency resource or a first subcarrier, and the second resource comprises a second frequency resource or a second subcarrier.

16. The apparatus of claim 12, wherein instructions causing the apparatus to conjugate and time-reverse comprises causing the apparatus to conjugate, time-reverse and negate at least the first group of data symbols to generate a reversed-conjugated first group of data symbols.

17. The apparatus of claim 12, wherein instructions causing the apparatus to spread comprises causing the apparatus to spread the pre-spread symbols for each of the first and second blocks of pre-spread symbols via a Discrete Fourier Transform or Fast Fourier Transform to create a first block of spread symbols and a second block of spread symbols, respectively.

18. A computer program product, the computer program product comprising a non-transitory computer-readable storage medium and storing executable code that, when executed by at least one data processing apparatus, is configured to cause the at least one data processing apparatus to perform a method comprising:

generating a first group of data symbols;

conjugating and time-reversing the first group of data symbols to generate a reversed-conjugated first group of data symbols;

appending a first quantity of zeros before and a second quantity of zeros after the reversed-conjugated first group of data symbols to generate a first block of pre-spread symbols;

appending the first quantity of zeros before and the second quantity of zeros after the first group of data symbols to generate a second block of pre-spread symbols;

spreading the pre-spread symbols for each of the first and second blocks of pre-spread symbols to create a first block of spread symbols and a second block of spread symbols, respectively;

mapping, for each of the first and second blocks of spread symbols, each of the spread symbols to an occupied subcarrier;

performing modulation on the first and second blocks of spread data symbols mapped to subcarriers to create a first block of time domain symbols and a second block of time domain symbols, respectively; and transmitting the first block of time domain symbols via a first resource and transmitting the second block of time domain symbols via a second resource where the second resource is different from the first resource;

wherein the zeros appended before and after the reversed-conjugated first group of data symbols creates, in the first block of time domain symbols, a first number of near-zero symbols before and a second number of near-zero symbols after a plurality of non-zero time domain data symbols.

19. A method comprising:
controlling receiving, in parallel during a symbol time interval, a first block of time domain symbols and a second block of time domain symbols;
converting the first block of time domain symbols and the second block of time domain symbols to the frequency domain to create a first pre-equalized block of frequency domain symbols and a second pre-equalized block of frequency domain symbols, respectively;
applying, for at least one of the first and second pre-equalized blocks of frequency domain symbols, a linear phase shift to the frequency domain symbols to compensate for a conjugating and time-reversing of corresponding pre-spread domain symbols being performed at a transmitter before spreading of the pre-spread domain symbols;
creating a first equalized block of frequency domain symbols and a second equalized block of frequency domain symbols as a function of the first and second pre-equalized blocks of frequency domain symbols wherein at least one of the first and second pre-equalized blocks of frequency domain symbols has the linear phase shift applied;
converting the first and second equalized blocks of frequency domain symbols to the time domain to create a first equalized block of time domain symbols and a second equalized block of time domain symbols; and
removing a first group of pre-pended near-zero symbols and a second group of post-pended near-zero symbols from both of the first and second equalized blocks of time domain symbols to create a first group of data symbols and a second group of data symbols;
wherein the first group of pre-pended near-zero symbols and the second group of post-pended near-zero symbols correspond to a first quantity of zeros appended before a group of original data symbols and a second quantity of zeros appended after the original group of data symbols at a transmitter that transmits the first block of time domain symbols and the second block of time domain symbols.

20. The method of claim 19 wherein the converting comprises:
converting the first block of time domain symbols and the second block of time domain symbols to the frequency domain via a Fourier Transform to create a first pre-equalized block of frequency domain symbols and a second pre-equalized block of frequency domain symbols, respectively.

21. The method of claim 19 wherein an amount of the linear phase shift applied to the frequency domain symbols is based on a number of the first group of pre-pended near-zero symbols and a number of the second group of post-pended near-zero value symbols.

22. An apparatus comprising at least one processor and at least one memory including computer instructions, when executed by the at least one processor, cause the apparatus to:
control receiving, in parallel during a symbol time interval, a first block of time domain symbols and a second block of time domain symbols;
convert the first block of time domain symbols and the second block of time domain symbols to the frequency domain to create a first pre-equalized block of frequency domain symbols and a second pre-equalized block of frequency domain symbols, respectively;
apply, for at least one of the first and second pre-equalized blocks of frequency domain symbols, a linear phase shift to the frequency domain symbols to compensate for a conjugating and time-reversing of corresponding pre-spread domain symbols being performed at a transmitter before spreading of the pre-spread domain symbols;
create a first equalized block of frequency domain symbols and a second equalized block of frequency domain symbols as a function of the first and second pre-equalized blocks of frequency domain symbols wherein at least one of the first and second pre-equalized blocks of frequency domain symbols has the linear phase shift applied;
convert the first and second equalized blocks of frequency domain symbols to the time domain to create a first equalized block of time domain symbols and a second equalized block of time domain symbols; and
remove a first group of pre-pended near-zero symbols and a second group of post-pended near-zero symbols from both of the first and second equalized blocks of time domain symbols to create a first group of data symbols and a second group of data symbols;
wherein the first group of pre-pended near-zero symbols and the second group of post-pended near-zero symbols correspond to a first quantity of zeros appended before a group of original data symbols and a second quantity of zeros appended after the original group of data symbols at a transmitter that transmits the first block of time domain symbols and the second block of time domain symbols.

23. The apparatus of claim 22, wherein instructions causing the apparatus to convert comprises causing the apparatus to:
convert the first block of time domain symbols and the second block of time domain symbols to the frequency domain via a Fourier Transform to create a first pre-equalized block of frequency domain symbols and a second pre-equalized block of frequency domain symbols, respectively.

24. The apparatus of claim 22, wherein an amount of the linear phase shift applied to the frequency domain symbols is based on a number of the first group of pre-pended near-zero symbols and a number of the second group of post-pended near-zero value symbols.

25. A computer program product, the computer program product comprising a non-transitory computer-readable storage medium and storing executable code that, when executed by at least one data processing apparatus, is configured to cause the at least one data processing apparatus to perform a method comprising:
controlling receiving, in parallel during a symbol time interval, a first block of time domain symbols and a second block of time domain symbols;
converting the first block of time domain symbols and the second block of time domain symbols to the frequency domain to create a first pre-equalized block of frequency domain symbols and a second pre-equalized block of frequency domain symbols, respectively;
applying, for at least one of the first and second pre-equalized blocks of frequency domain symbols, a linear phase shift to the frequency domain symbols to compensate for a conjugating and time-reversing of corresponding pre-spread domain symbols being performed at a transmitter before spreading of the pre-spread domain symbols;
creating a first equalized block of frequency domain symbols and a second equalized block of frequency domain symbols as a function of the first and second pre-equalized blocks of frequency domain symbols wherein at least one of the first and second pre-equalized blocks of frequency domain symbols has the linear phase shift applied;

converting the first and second equalized blocks of frequency domain symbols to the time domain to create a first equalized block of time domain symbols and a second equalized block of time domain symbols; and removing a first group of pre-pended near-zero symbols and a second group of post-pended near-zero symbols from both of the first and second equalized blocks of time domain symbols to create a first group of data symbols and a second group of data symbols;

wherein the first group of pre-pended near-zero symbols and the second group of post-pended near-zero symbols correspond to a first quantity of zeros appended before a group of original data symbols and a second quantity of zeros appended after the original group of data symbols at a transmitter that transmits the first block of time domain symbols and the second block of time domain symbols.

* * * * *